(12) United States Patent
Gotoh et al.

(10) Patent No.: US 8,762,777 B2
(45) Date of Patent: *Jun. 24, 2014

(54) SUPPORTING DETECTION OF FAILURE EVENT

(71) Applicant: International Business Machines Corporation, Armonk, NY (US)

(72) Inventors: Yasuhisa Gotoh, Yokohama (JP); Yuhsuke Kaneyasu, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/796,196

(22) Filed: Mar. 12, 2013

(65) Prior Publication Data

US 2013/0191694 A1    Jul. 25, 2013

Related U.S. Application Data

(63) Continuation of application No. 13/122,980, filed on Apr. 7, 2011.

(30) Foreign Application Priority Data

Oct. 30, 2008    (JP) ................................ 2008-279289

(51) Int. Cl.
    *G06F 11/00*    (2006.01)
(52) U.S. Cl.
    USPC .................... 714/25; 714/37; 714/48; 714/52
(58) Field of Classification Search
    USPC .................... 714/25, 37, 45, 48, 52
    See application file for complete search history.

(56) References Cited

U.S. PATENT DOCUMENTS 5,748,880 A * 5/1998 Ito et al. ........................... 714/46
5,854,834 A * 12/1998 Gottlieb et al. ........... 379/114.04

(Continued)

FOREIGN PATENT DOCUMENTS

EP    1 622 306 A2    2/2006
JP    11243390 A    9/1999

(Continued)

OTHER PUBLICATIONS

Extended European Search Report, including the Supplementary European Search Report and the European Search Opinion, dated Mar. 5, 2012 for International Application No. /Patent No. 09823493. 3-1225/2354948 PCT/JP2009068054, 8 pages.

(Continued)

*Primary Examiner* — Loan L. T. Truong
(74) *Attorney, Agent, or Firm* — Stephen R. Tkacs; Stephen J. Walder, Jr.; Jeffrey S. LaBaw

(57) ABSTRACT

In a mechanism for supporting detection of a failure event, history information of a system including log information of the system including plural components and/or failure information output from each component upon occurrence of a failure in the system is collected. A detection rule for detecting an event included in a component related to the failure that has occurred is generated, and a symptom with additional information added to the generated detection rule is applied to detect the event that has caused the failure. System configuration information as configuration information of the system is acquired, and from the acquired system configuration information, partial configuration information as system configuration information related to the component that sent out the event the selection of which has been accepted is extracted. The extracted partial configuration information is added to the symptom to update the symptom.

11 Claims, 27 Drawing Sheets

(56) References Cited

U.S. PATENT DOCUMENTS

| | | | |
|---|---|---|---|
| 6,813,634 B1* | 11/2004 | Ahmed | 709/224 |
| 6,990,601 B1 | 1/2006 | Tsuneya et al. | |
| 7,028,228 B1* | 4/2006 | Lovy et al. | 714/57 |
| 7,080,141 B1 | 7/2006 | Baekelmans et al. | |
| 7,133,866 B2 | 11/2006 | Rishel et al. | |
| 7,249,286 B1 | 7/2007 | Krishnan | |
| 7,389,444 B2* | 6/2008 | Ma et al. | 714/26 |
| 7,409,317 B2* | 8/2008 | Cousin et al. | 702/183 |
| 7,433,855 B2* | 10/2008 | Gavan et al. | 706/47 |
| 7,467,161 B2* | 12/2008 | Frisina | 1/1 |
| 7,526,677 B2* | 4/2009 | Choe et al. | 714/27 |
| 7,610,512 B2* | 10/2009 | Gerber | 714/26 |
| 7,698,104 B2 | 4/2010 | Cousin et al. | |
| 7,756,971 B2 | 7/2010 | Sutou et al. | |
| 7,779,101 B1 | 8/2010 | Zahavi et al. | |
| 7,941,706 B2* | 5/2011 | Yuasa et al. | 714/47.1 |
| 7,949,906 B2* | 5/2011 | Ikegami | 714/57 |
| 8,041,710 B2* | 10/2011 | He et al. | 707/722 |
| 8,296,104 B2 | 10/2012 | Ramacher et al. | |
| 8,296,732 B2* | 10/2012 | Fraley et al. | 717/121 |
| 8,375,370 B2 | 2/2013 | Chaar et al. | |
| 8,429,467 B2 | 4/2013 | Fallen et al. | |
| 8,489,728 B2* | 7/2013 | Vinberg et al. | 709/224 |
| 2004/0153823 A1* | 8/2004 | Ansari | 714/38 |
| 2005/0015678 A1 | 1/2005 | Miller | |
| 2005/0081118 A1* | 4/2005 | Cheston et al. | 714/47 |
| 2005/0086502 A1* | 4/2005 | Rayes et al. | 713/189 |
| 2006/0053477 A1 | 3/2006 | Grabarnik et al. | |
| 2006/0101308 A1 | 5/2006 | Agarwal et al. | |
| 2006/0161884 A1* | 7/2006 | Lubrecht et al. | 717/104 |
| 2006/0248407 A1* | 11/2006 | Adams et al. | 714/43 |
| 2008/0065577 A1* | 3/2008 | Chefalas et al. | 706/47 |
| 2008/0082587 A1 | 4/2008 | Yada et al. | |
| 2008/0235611 A1 | 9/2008 | Fraley et al. | |
| 2009/0063387 A1 | 3/2009 | Beaty et al. | |
| 2010/0082620 A1 | 4/2010 | Jennings, III et al. | |

FOREIGN PATENT DOCUMENTS

| | | |
|---|---|---|
| JP | 2001125854 A | 5/2001 |
| JP | 2004103015 A | 3/2004 |
| JP | 2005538459 A | 3/2004 |
| JP | 2008/041041 A | 2/2008 |
| JP | 2008/090504 A | 4/2008 |
| JP | 2008-137810 A | 6/2008 |
| WO | WO2010/050381 A1 | 6/2008 |

OTHER PUBLICATIONS

U.S. Appl. No. 13/122,980.

Office Action mailed Oct. 1, 2013 for U.S. Appl. No. 13/122,980, 10 pages.

\* cited by examiner

SUPPORTING DETECTION OF FAILURE EVENT

BACKGROUND

The present invention relates to mechanisms for supporting detection of a failure event to maintain a high degree of failure detection accuracy without unduly increasing the amount of symptom storage.

With the rapid development of computer technology today, computer systems are naturally incorporated in backbone systems constructing a social infrastructure. In order to operate the social infrastructure normally at all times, considerable operation costs are required. An autonomic computing system has attracted attention as a technique for reducing the operation costs as much as possible and increasing the degree of system stability.

The autonomic computing system is a generic term describing all major areas of technology for constructing a system-scale, self-managing environment, which means an entire system for detecting a problem or failure that arises in a system and autonomously eliminating the problem or failure. Various methods for detecting a problem or failure that arises in a system are disclosed.

For example, a method exists for root cause identification in which part of a dependency model related to a subject structural element and other structural elements upon which the subject structural element depends is scanned to identify a root cause of a condition of the subject structural element including a failure in order to determine a condition status associated with each of the structural elements. Further, a dependency management method exists for managing dependency information among various components of a computing environment, especially for managing runtime dependencies.

However, though the method for root cause identification can detect a root cause with a high degree of accuracy by scanning the dependency model everywhere from the upstream to the downstream, if the dependency model is complicated, scanning itself requires significant time, and since the order of scanning the dependency model is not specified, there is a problem that may cause reduction of performance and usability.

Further, the dependency model is often constructed in the form of a logical formula with event parameters. For example, though the dependency information among components is managed, the dependency information does not include system configuration information. Therefore, even if dependency models to be scanned are narrowed down from the logical formula, there is a possibility of detecting a wrong root cause, and hence there is a problem of making it difficult to improve detection accuracy.

SUMMARY

In one illustrative embodiment, there is provided an apparatus for supporting detection of a failure event, the apparatus comprising a processor and a memory coupled to the processor. The memory comprises instructions which, when executed by the processor, cause the processor to collect history information of a system including plural components, the history information including log information of the system and failure information output from at least one component upon occurrence of a failure in the system. The instructions further cause the processor to generate a detection rule for detecting an event included in a component related to the failure that has occurred. The instructions further cause the processor to store a symptom with additional information added to the generated detection rule. The instructions further cause the processor to acquire system configuration information as configuration information of the system. The instructions further cause the processor to accept selection of an event and extract, from the acquired system configuration information, partial configuration information as system configuration information related to a component that sent out the event the selection of which has been accepted. The instructions further cause the processor to add the extracted partial configuration information to the symptom to update the symptom.

In another illustrative embodiment, there is a provided a method of supporting detection of a failure event, the method comprising collecting history information of a system including plural components, the history information including log information of the system and failure information output from at least one component upon occurrence of a failure in the system. The method further comprises generating a detection rule for detecting an event included in a component related to the failure that has occurred; storing a symptom with additional information added to the generated detection rule; and acquiring system configuration information as configuration information of the system. The method further comprises accepting selection of an event and extracting, from the acquired system configuration information, partial configuration information as system configuration information related to the component that sent out the event the selection of which has been accepted. The method further comprises adding the extracted partial configuration information to the symptom to update the symptom.

In accordance with another illustrative embodiment, there is a provided a computer program product comprising a computer recording medium having a computer program recorded thereon capable of being executed on a computer to support detection of an event that has caused a failure in a system including plural components. The program causes the computer to collect history information of the system including log information of the system and failure information output from at least one component upon occurrence of the failure in the system. The computer program farther causes the computer to generate a detection rule for detecting the event included in a component related to the failure that has occurred, store a symptom with additional information added to the generated detection rule, and system configuration information as configuration information of the system. The computer program further causes the computer to accept selection of an event and extract, from the acquired system configuration information, partial configuration information as system configuration information related to a component that sent out the event the selection of which has been accepted. The computer program farther causes the computer to add the extracted partial configuration information to the symptom to update the symptom.

DETAILED DESCRIPTION

Figure 1:
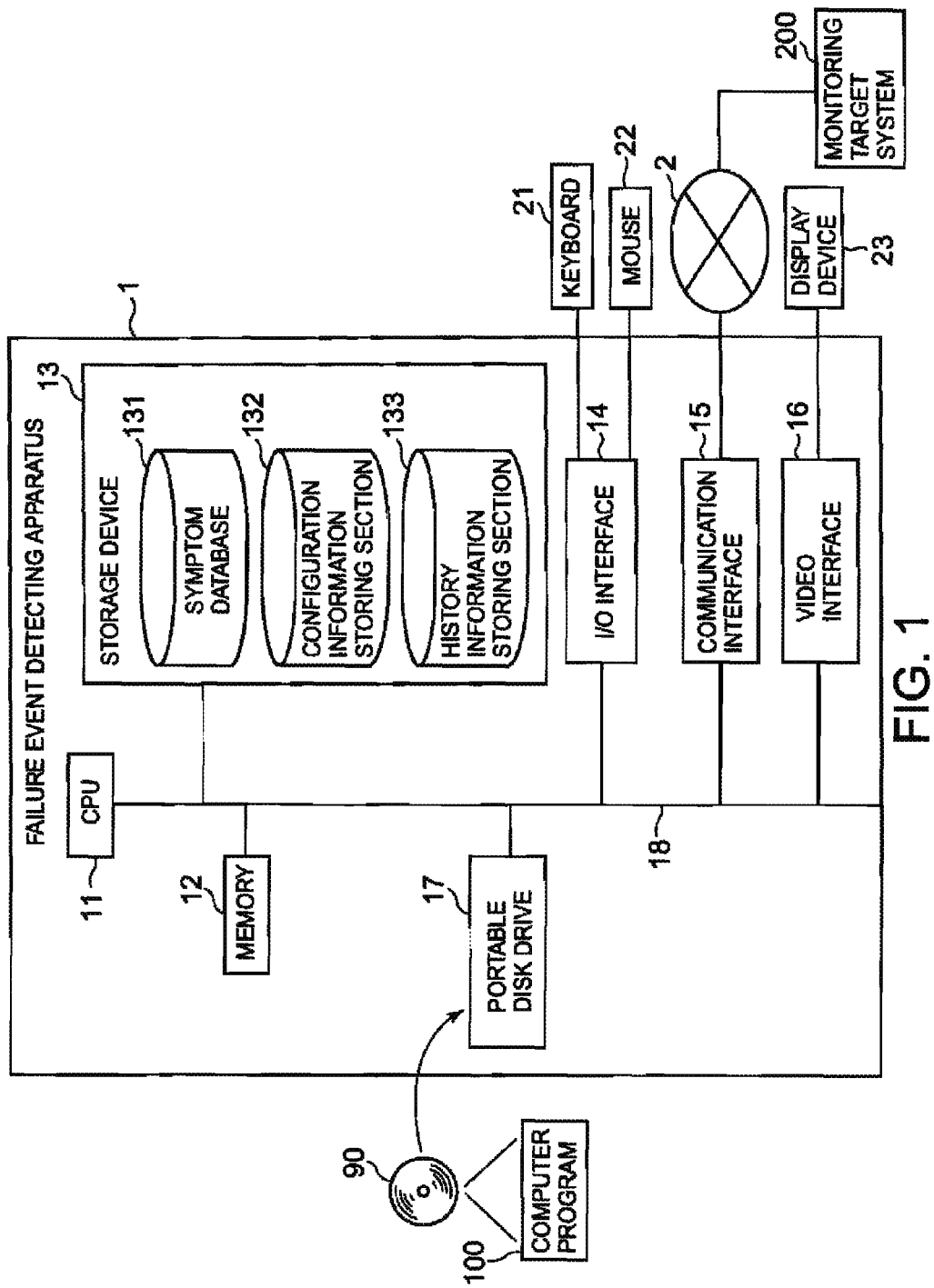
FIG. 1 is a block diagram showing a configuration example of a failure event detecting apparatus according to an illustrative embodiment.

Apparatuses for supporting detection of a failure event according to embodiments of the present invention will be specifically described below with reference to the accompanying drawings. The following embodiments do not limit the inventions described in the scope of claims, and not all the combinations of features described in the embodiments are requisites as resolving means of the present invention.

Further, the present invention can be carried out in a variety of different modes, and should not be limited to the descriptions given for the embodiments. It should be noted that the same reference numerals are employed throughout the embodiments to denote the same elements.

The following embodiments describe the apparatuses for supporting detection of a failure event, which introduce a computer program into a computer system. As will be apparent to those skilled in the art, part of the present invention can be implemented as the computer program capable of being executed on a computer. Therefore, the present invention can take the form of a mode as hardware called an apparatus for supporting detection of a failure event, a mode as software, or a mode as a combination of software and hardware. The computer program can be recorded on a recording medium readable by any computer, such as a hard disk, a DVD, a CD, an optical storage device, or a magnetic storage device.

In the embodiments of the present invention, partial configuration information is added to a symptom and the contents of stored symptoms are checked, so that a root cause event that has caused a failure can be identified with a high degree of accuracy. This makes it easy to narrow down under which condition the event causing the failure has been detected. Here, the term "partial configuration information" means related information including dependencies between a component, which sent out an event that has caused a failure among components constructing the system, and other components. For example, related information between an application server and a database, both being components, link information, etc. are included. Therefore, a topology diagram between target components can be created correctly.

Further, not only the information about dependencies among components, but also information capable of deriving associations useful for failure analysis, such as, for example, the relation of connection in communication, and the relation between subject and object of operations in accordance with commands or instructions, can be added to the symptom, so that the root cause that has caused the failure can be identified with a higher degree of accuracy. This makes it easy to narrow down under which condition the event causing the failure has been detected.

FIG. 1 is a block diagram showing a configuration example of a failure event detecting apparatus including an apparatus for supporting detection of a failure event according to an illustrative embodiment. The failure event detecting apparatus 1 is configured to include at least a CPU (Central Processing Unit) 11, a memory 12, a storage device 13, an I/O interface 14, a communication interface 15, a video interface 16, a portable disk drive 17, and an internal bus 18 connecting the above-mentioned hardware components.

The CPU 11 is connected to each of the above-mentioned hardware components of the failure event detecting apparatus 1 through the internal bus 18 to control the operation of each of the above-mentioned hardware components and executes various software functions according to a computer program 100 stored in the storage device 13. The memory 12 is configured as a volatile memory, such as SRAM (Static Random Access Memory) or SDRAM (Synchronous Dynamic Random Access Memory). Upon running the computer program 100, a load module is loaded into the memory 12, and temporary data and the like generated during execution of the computer program 100 are stored in the memory 12.

The storage device 13 is configured as a built-in fixed type storage device (hard disk), a ROM, or the like. The computer program 100 may be downloaded to storage device 13 from a portable recording medium 90, such as a DVD or a CD-ROM, on which the program and information such as data are recorded, through the portable disk drive 17, and during the execution, loaded from the storage device 13 into the memory 12. Of course, the computer program may be downloaded from an external computer connected to a network 2 through the communication interface 15.

The storage device 13 also includes a symptom database 131. In the symptom database 131, not only defection rules for detecting events each of which has caused a failure, but also recommended actions, comments, and the like are added to each of the detection rules. When a user selects an event that has caused a failure and enters information necessary to generate a detection rule such as a rule pattern, a detection rule is extracted according to the selected event, and displayed on a display device 23 together with a topology diagram of components.

Further, the storage device 13 includes a configuration information storing section 132 storing system configuration information of a system to be monitored as to whether a failure has occurred or not, and a history information storing section 133 storing history information such as log information of the system to be monitored, event information output when a failure has occurred in the system, etc. The configuration information storing section 132 is configured as a CCMDB (Change and Configuration Management DB) including dependency information among components of a monitoring target system 200 to be monitored, related information of each component, and the like. The topology diagram of the components can be displayed based on the system configuration information stored in the configuration information storing section 132. Although the configuration information storing section 132 may be included in the storage device 13, it is normally provided separately from the failure event detecting apparatus 1 according to the illustrative embodiment; e.g., it is provided in an external computer connected through the network 2.

The communication interface 15 is connected to the internal bus 18 so that it can exchange data with the external computer or the like by being connected to the external network 2 such as the Internet, LAN, or WAN. The communication interface 15 is also connected to the monitoring target system 200 through the network 2, making it possible to acquire the system configuration information, the history information at the time of occurrence of a failure, and the like.

The I/O interface 14 is connected to data input media, such as a keyboard 21 and a mouse 22, to receive data input. The video interface 16 is connected to the display device 23, such as a CRT (Cathode Ray Tube) monitor or an LCD (Liquid Crystal Display), to display certain images.

Figure 2:
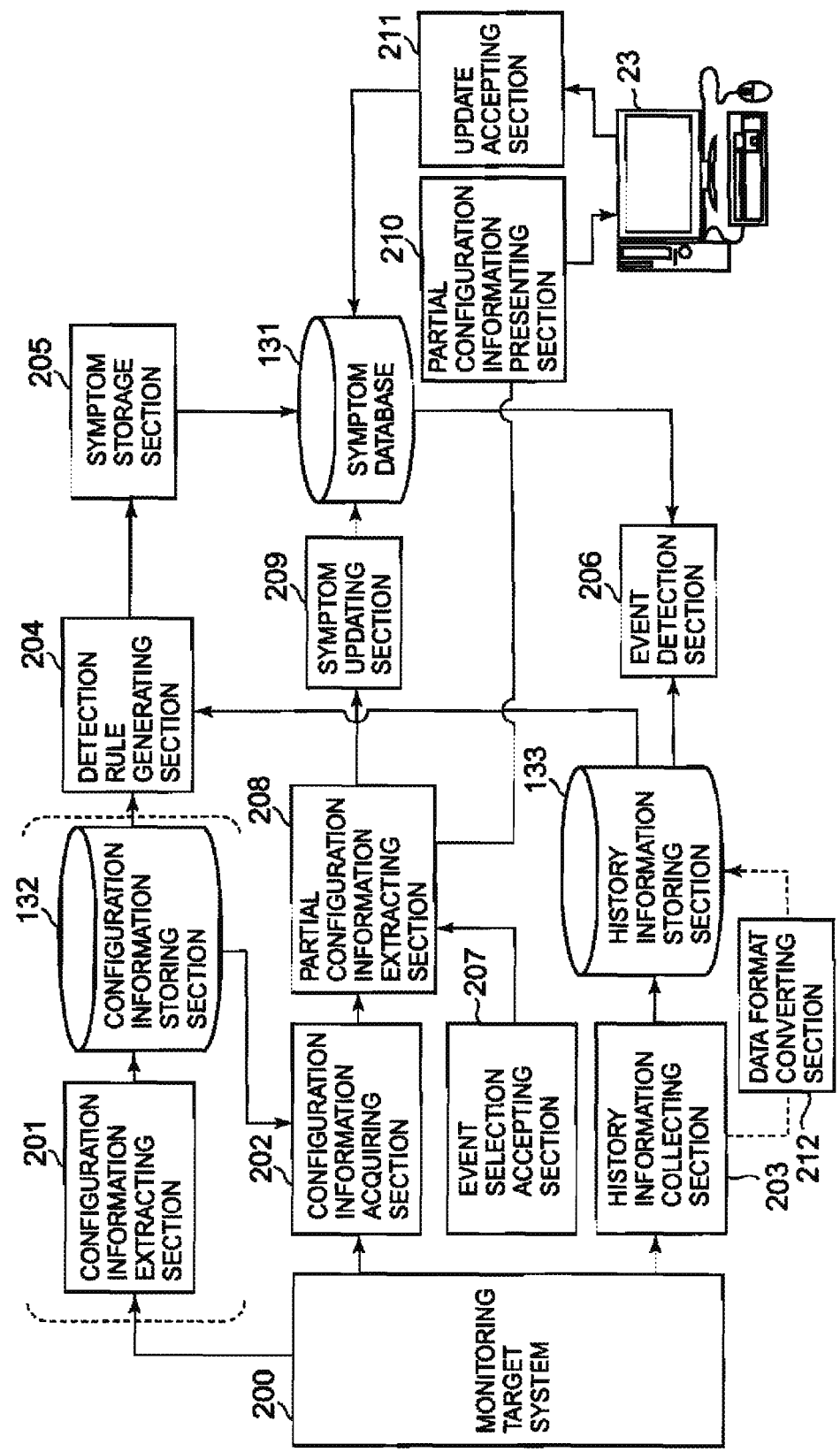
FIG. 2 is a functional block diagram of the failure event detecting apparatus according to an illustrative embodiment.

FIG. 2 is a functional block diagram of the failure event detecting apparatus 1 according to an illustrative embodiment. A configuration information extracting section 201 extracts system configuration information including related information among components included in the monitoring target system 200, and stores it in the configuration information storing section 132. The system configuration information including the related information among components includes, for example, information on the relation of connections among components in communication, link related information related to an operating/non-operating relationship, etc. Note that the configuration information extracting section 201 is not a structural element indispensable to the illustrative embodiment, and the system configuration information may be generated beforehand in the configuration information storing section 132, or may not be incorporated in the failure event detecting apparatus 1. In other words, the configuration information extracting section 201 and the configuration information storing section 132 are not structural elements indispensable to the failure event detecting apparatus 1 according to the illustrative embodiment.

A configuration information acquiring section 202 acquires the system configuration information stored in the configuration information storing section 132. The system configuration information is stored in the configuration information storing section 132 in association with each monitoring target system 200, and the configuration information acquiring section 202 acquires corresponding system configuration information according to the monitoring target system 200.

A history information collecting section 203 monitors the monitoring target system 200 at all times, collects history information including log information output from each component included in the monitoring target system 200 and/or failure information such as event information output upon occurrence of a failure, and stores the history information in the history information storing section 133. The log information is not limited to system logs output at ail times, and it may include message information output by interrupt processing or the like at the time of failure occurrence.

Note that the pieces of history information collected by the history information collecting section 203 are often different in data format so that they may not be able to be used as they are as basic information for identifying events as candidates for an event that has caused a failure. Therefore, it is desirable to include a data format converting section 212 in order to convert the pieces of history information into a standard unified data format and store them in the history information storing section 133.

A detection rule generating section 204 generates a detection rule for detecting an event included in a component related to a failure that has occurred. A symptom storage section 205 stores a symptom with certain additional information added to the generated detection rule. As the additional information, information related to recommended actions and the like at the time of failure detection, message information including various comments, etc. are added.

An event detection section 206 detects, based on stored symptoms, an event that has caused a failure. For example, upon applying a symptom to which system configuration information of the monitoring target system 200 is added as the additional information, event detection processing can be performed in consideration of the system configuration information.

An event selection accepting section 207 accepts selection of the event, included in the component related to the failure that has occurred, as selection from an event list or the like, for example. A partial configuration information extracting section 208 extracts, from the system configuration information acquired by the configuration information acquiring section 202, partial configuration information as the system configuration information related to the component that sent out the event the selection of which has been accepted by the event selection accepting section 207. The partial configuration information to be extracted includes related information including dependencies between the component which, among the components constructing the system, sent out the event the selection of which has been accepted as a failure causing event, and other components. For example, related information between an application server and a database, both being components, link information, etc. are included.

Figure 3:
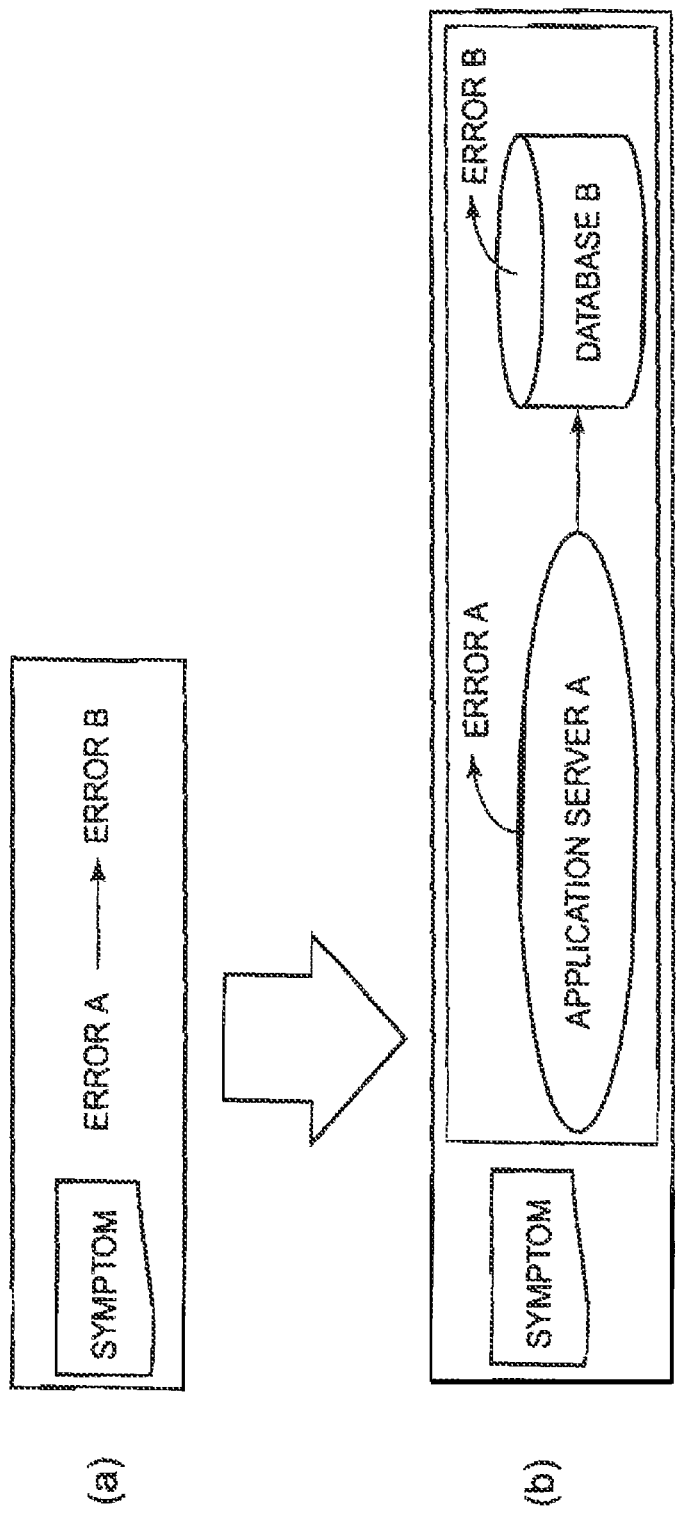
FIG. 3 is a schematic diagram of the structure of a symptom including partial configuration information in the failure event detecting apparatus according to an illustrative embodiment.

FIG. 3 contains an illustration of the structure of a symptom including the partial configuration information in the failure event detecting apparatus 1 according to an illustrative embodiment. FIG. 3(*a*) is an illustration of the structure of a conventional symptom, having causal relation information indicating, as logic information, that error B is derived from error A.

On the other hand, FIG. 3(*b*) is an illustration of the structure of the symptom to which the partial configuration information is added. In this case, the symptom is configured to add, to the causal relation information as logic information, information indicating that error B arises in database B as a specific component from error A arising in application server A as a specific component. In other words, information related to a dependency between application server A and database B, both being components, is added, so that the dependency between components can be considered as the symptom for detecting an event that has caused a failure, thereby making it possible to improve the detection accuracy of the failure causing event.

A symptom updating section 209 adds the partial configuration information extracted by the partial configuration information extracting section 208 to a corresponding symptom, and stores it. In other words, the partial configuration information becomes additional information. A partial configuration information presenting section 210 presents, to the display device 23, the partial configuration information extracted by the partial configuration information extracting section 208. An update accepting section 211 accepts an update of the presented partial configuration information. This allows the user to change the presented partial configuration information to a desired structure in order to generate suitable partial configuration information without fail.

Figure 4:
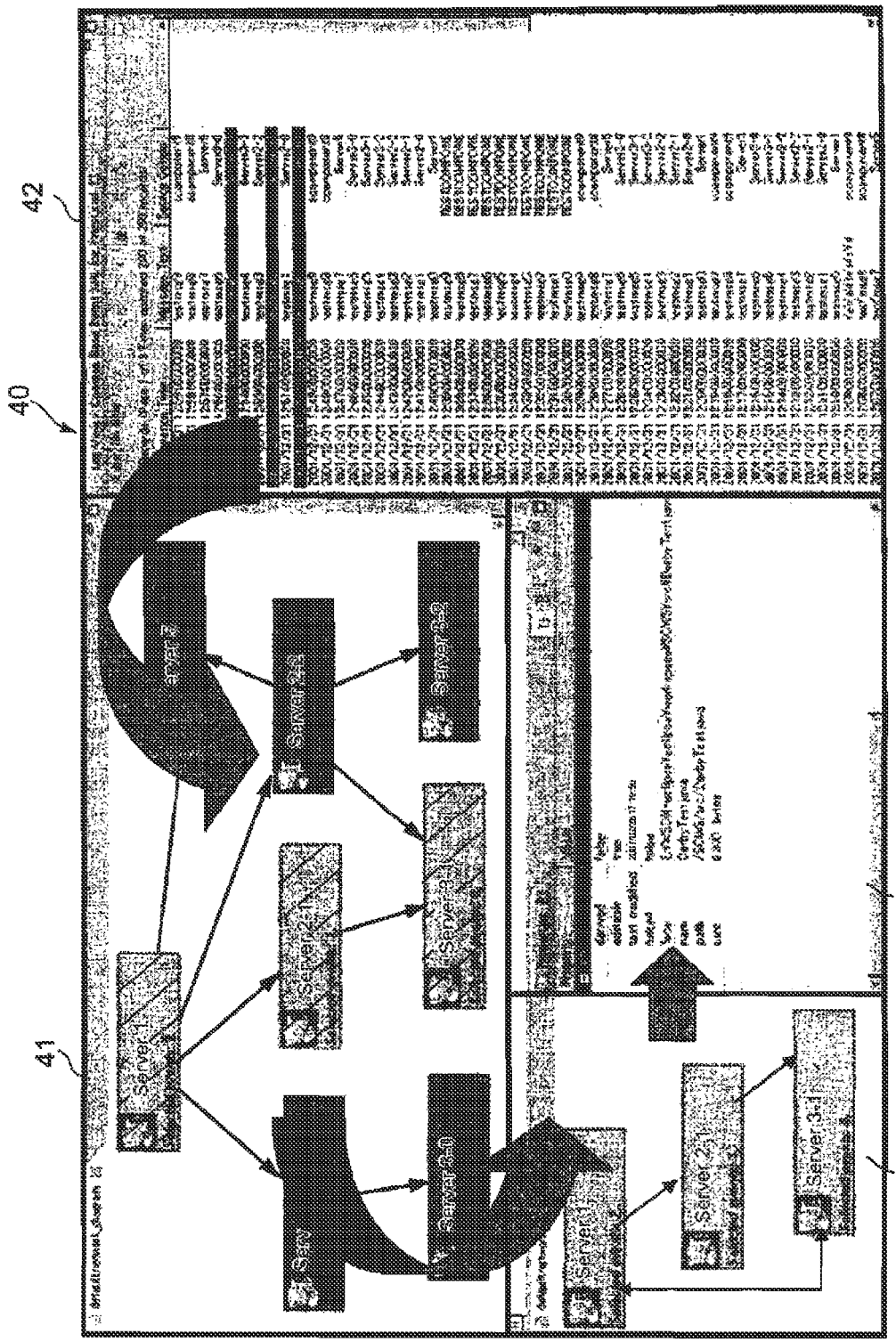
FIG. 4 is an illustration of a screen presented on a display device by means of a partial configuration information presenting section in accordance with an example embodiment.

FIG. 4 is an illustration of a screen 40 presented on the display device 23 by means of the partial configuration information presenting section 210 in accordance with an example embodiment. Displayed in a topology diagram displaying area 41 is a topology diagram showing dependencies among components included in the monitoring target system 200. In an event list displaying area 42, events included in the monitoring target system 200 are listed. When the event selection accepting section 207 accepts selection of an event, included in a component related to a failure that has occurred, from among a group of events displayed in the event list displaying area 42, the event the selection of which has been accepted and events having dependencies are highlighted. In FIG. 4, the event the selection of which has been accepted and the events having dependencies are displayed by changing the display color. The highlighting method is not particularly limited, and brightness may be changed.

In a partial configuration information displaying area 43, a topology diagram of components that depend on the event the selection of which has been accepted is partially displayed by means of the partial configuration information presenting section 210. In a component displaying area 44, the contents of components displayed in the partial configuration information displaying area 43 are displayed in detail. The update accepting section 211 accepts update information on the components displayed in the partial configuration information displaying area 43 so that the partial configuration information can be updated. Specifically, it is updated by selecting an event again with a mouse operation or the like from the events listed in the event list displaying area 42.

Figure 5:
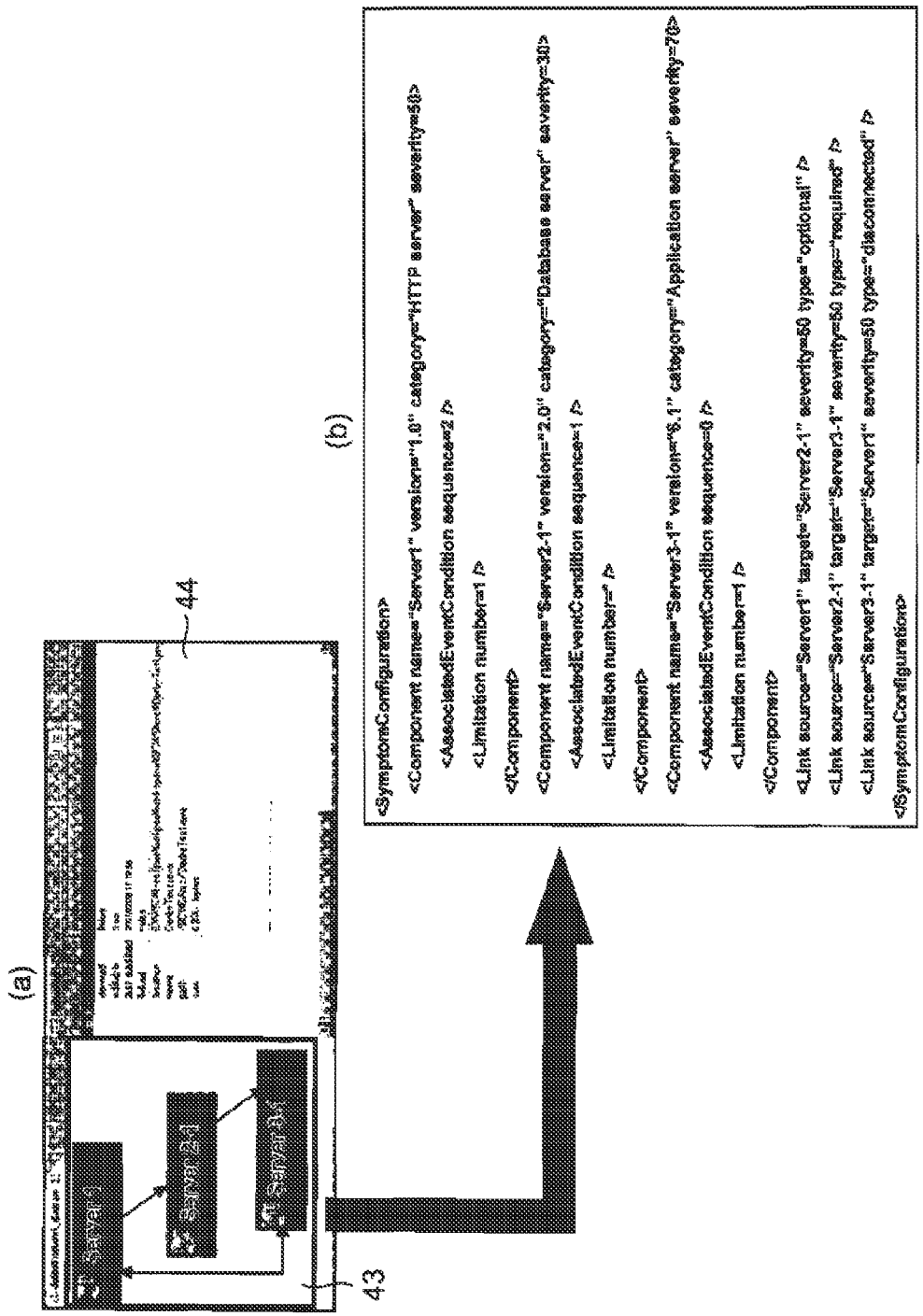
FIG. 5 is an illustration of stored partial configuration information in accordance with an example embodiment.

The partial configuration information is stored in the symptom database 131 as information including dependencies for each component. FIG. 5 contains illustrations of the partial configuration information to be stored in accordance with an example embodiment. FIG. 5(*a*) is an illustration of the partial configuration information displaying area 43 and the component displaying area 44. FIG. 5(*b*) shows a data example of the partial configuration information to be stored. As shown in FIG. 5(*b*), the type of component, a dependency, and link information between components are stored as code information for each component extracted in the partial configuration information displaying area 43. Of course, the data format to be stored is not limited to the data format shown in FIG. 5.

Figure 6:
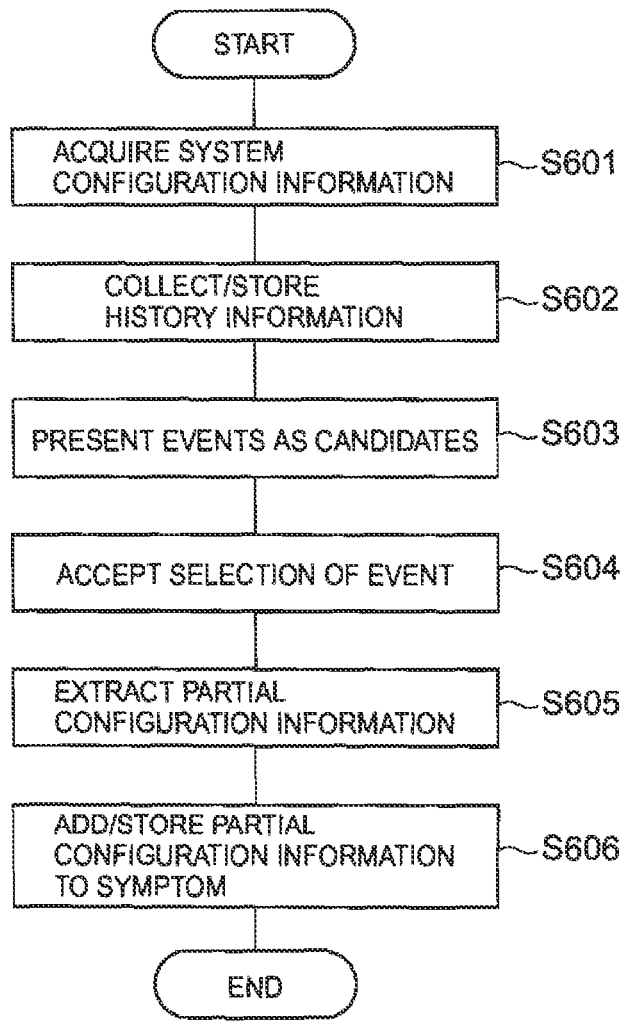
FIG. 6 is a flowchart showing a procedure of partial configuration information adding processing performed by a CPU of the failure event detecting apparatus according to an illustrative embodiment.

FIG. 6 is a flowchart showing a procedure of partial configuration information adding processing performed by the CPU 11 of the failure event detecting apparatus 1 according to an illustrative embodiment. First, the CPU 11 of the failure event detecting apparatus 1 acquires system configuration information including related information among components included in the monitoring target system 200 (step S601). Of course, the system configuration information may be acquired beforehand and prestored in the configuration information storing section 132.

The CPU 11 collects pieces of history information including log information output from each component included in the monitoring target system 200 and/or failure information such as event information output upon occurrence of a failure (step S602). The log information is not limited to system logs output at all times, and it may include message information output by interrupt processing at the time of failure occurrence.

The pieces of history information collected by the history information collecting section 203 are often different in data format from one another so that they may not be able to be used as they are as basic information for identifying events as candidates for an event that has caused a failure. Therefore, it is desirable to convert the collected pieces of history information into a standard unified data format before storing them in the history information storing section 133. This makes it possible to collect, in the standard unified data format, even history information different in data format from component to component, and hence to make use of all pieces of history information at the time of detection rule generation.

The CPU 11 presents, to the display device 23, all events as candidates for a failure causing event (step S603), and accepts selection of an event from the user (step S604). Specifically, with a mouse operation or the like, the CPU 11 accepts the selection of an event as selection from the event list or the like.

Based on the event the selection of which has been accepted and the acquired system configuration information, the CPU 11 extracts partial configuration information as system configuration information related to a component that sent out the event the selection of which has been accepted (step S605). The partial configuration information to be extracted includes related information including dependences between the component which, among the components constructing the system, sent out the event the selection of which has been accepted as the failure causing event, and other components. For example, the related information between the application server and the database as shown in FIG. 3 is also included.

The CPU 11 adds the extracted partial configuration information to a corresponding symptom as additional information, and stores it (step S606). Thus, the partial configuration information is added to the symptom, so that the symptom in which the system configuration information of the monitoring target system 200 is reflected as well as a logical formula in a conventional manner can be generated as a detection rule. This makes it possible to significantly reduce the possibility of false positives, and hence to accurately determine whether it is an existing failure or not.

Thus, according to the illustrative embodiment, the partial configuration information is added to a symptom and the contents of stored symptoms are checked, so that a root cause event that has caused a failure can be identified with a higher degree of accuracy. This makes it easy to narrow down under which condition the event causing the failure has been detected.

Since the hardware configuration of a failure event detecting apparatus 1 including an apparatus for supporting detection of a failure event according to an alternative embodiment is the same as that of the embodiment described above, the detailed description thereof will be omitted by attaching the same reference numerals to denote the same elements. An alternative embodiment differs from the previously described embodiment in that when partial configuration information is added to each of symptoms, a symptom applied to failure detection processing is given priority.

Figure 7:
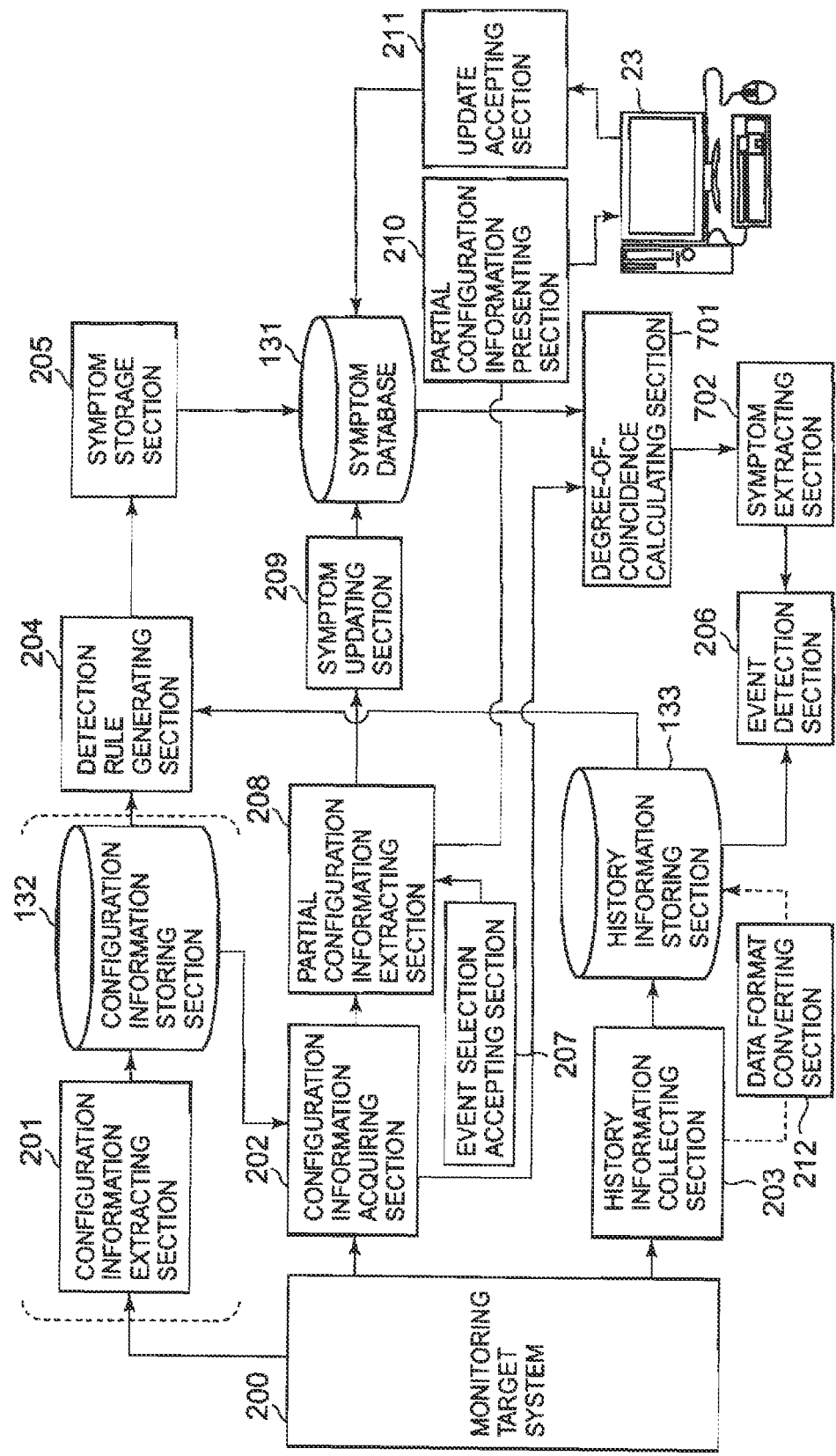
FIG. 7 is a functional block diagram of a failure event detecting apparatus according to an illustrative embodiment.

FIG. 7 is a functional block diagram of the failure event detecting apparatus 1 according to an illustrative embodiment. The configuration information extracting section 201 extracts system configuration information including related information among components included in the monitoring target system 200, and stores it in the configuration information storing section 132. The system configuration information including the related information among components includes, for example, information on the relation of connections among components in communication, link related information related to an operating/non-operating relationship, etc. Note that the configuration information extracting section 201 is not a structural element indispensable to the illustrative embodiments, and the system configuration information may be generated beforehand in the configuration information storing section 132, or may not be incorporated in the failure event detecting apparatus 1. In other words, the configuration information extracting section 201 and the configuration information storing section 132 are not structural elements indispensable to the failure event detecting apparatus 1 according to the illustrative embodiment.

The configuration information acquiring section 202 acquires the system configuration information stored in the configuration information storing section 132. The system configuration information is stored in the configuration information storing section 132 in association with each monitoring target system 200, and the configuration information acquiring section 202 acquires corresponding system configuration information according to the monitoring target system 200.

The history information collecting section 203 monitors the monitoring target system 200 at all times, collects history information including log information output from each component included in the monitoring target system 200 and/or failure information such as event information output upon occurrence of a failure, and stores the history information in the history information storing section 133. The log information is not limited to system logs output at all times, and it may include message information output by interrupt processing or the like at the time of failure occurrence.

Note that the pieces of history information collected by the history information collecting section 203 are often different in data format so that they may not be able to be used as they are as basic information for identifying events as candidates for an event that has caused a failure. Therefore, it is desirable to convert the pieces of history information into a standard unified data format and store them in the history information storing section 133.

The detection rule generating section 204 generates a detection rule for detecting an event included in a component related to the failure that has occurred. The symptom storage section 205 stores a symptom with certain additional information added to the generated detection rule. As the additional information, information related to recommended actions at the time of failure detection and the like, message information including various comments, etc. are added.

The event selection accepting section 207 accepts selection of the event, included in the component related to the failure that has occurred, as selection from the event list or the like, for example. The partial configuration information extracting section 208 extracts, from the system configuration information acquired by the configuration information acquiring section 202, partial configuration information as the system configuration information related to the component that sent out the event the selection of which has been accepted by the event selection accepting section 207. The partial configuration information to be extracted includes related information including dependencies between the component which, among the components constructing the system, sent out the event the selection of which has been accepted as a failure causing event, and other components. For example, related information between an application server and a database, both being components, link information, etc. are included.

The structure of the symptom including the partial configuration information in the failure event detecting apparatus 1 according to the illustrative embodiment is the same as the structure shown in FIG. 3(b) according to the previously described embodiment. In other words, information related to a dependency between application server A and database B, both being components, is added to a conventional symptom, so that the dependency between components can be considered as the symptom for detecting a failure causing event, thereby making it possible to more improve the detection accuracy of the failure causing event.

The symptom updating section 209 adds the partial configuration information extracted by the partial configuration information extracting section 208 to a corresponding symptom, and stores it. In other words, the partial configuration information becomes additional information. The partial configuration information presenting section 210 presents, to the display device 23, the partial configuration information extracted by the partial configuration information extracting section 208. The update accepting section 211 accepts an update of the presented partial configuration information. This allows the user to change the presented partial configuration information to a desired structure in order to generate suitable partial configuration information without fail.

Figure 8:
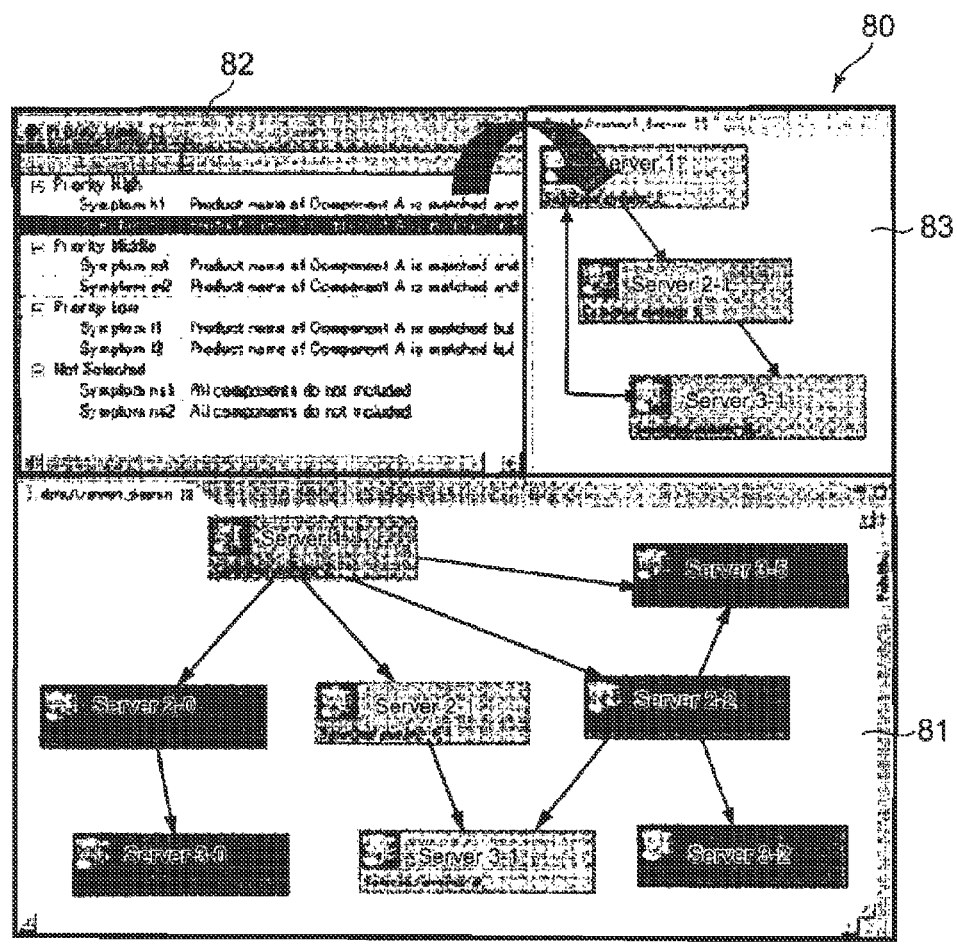
FIG. 8 is an illustration of a screen presented on the display device by means of the partial configuration information presenting section in accordance with an example embodiment.

FIG. 8 is an illustration of a screen 80 presented on the display device 23 by means of the partial configuration information presenting section 210 in accordance with an example embodiment. Displayed in a topology diagram displaying area 81 is a topology diagram showing dependencies among components included in the monitoring target system 200. in a symptom list displaying area 82, symptoms stored in the symptom database 131 are listed. For example, when selection of a symptom to be applied to detection of a failure causing event from among a group of symptoms displayed in the symptom list displaying area 82 is accepted, the partial configuration information added to the symptom the selection of which has been accepted is displayed in a partial configuration information displaying area 83.

Among the components displayed in the topology diagram displaying area 81, components that match the partial configuration information displayed in the partial configuration information displaying area 83 are highlighted at the time when the selection of the symptom is accepted. In FIG. 8, the symptom the selection of which has been accepted and portions corresponding to the partial configuration information added to the symptom are displayed by changing the display color. The highlighting method is not particularly limited, and brightness may be changed.

A degree-of-coincidence calculating section 701 compares the system configuration information acquired by the configuration information acquiring section 202 with the partial configuration information added to the symptom and stored by means of the symptom updating section 209 to calculate the degree of coincidence therebetween for each piece of partial configuration information stored in the symptom database 131.

Based on the degree of coincidence calculated by the degree-of-coincidence calculating section 701, a symptom extracting section 702 extracts a symptom to be applied by the event detection section 206. In other words, higher application priorities are given to symptoms that indicate higher degrees of coincidence to improve the detection accuracy of an event that has caused a failure.

The event detection section 206 applies symptoms sequentially in order of degree of coincidence to detect an event that has caused a failure. Thus, the symptoms that indicate higher degrees of coincidence are given higher application priorities, so that the possibility of false positives can be reduced, thereby making it possible to improve the detection accuracy of the event that has caused the failure.

Figure 9:
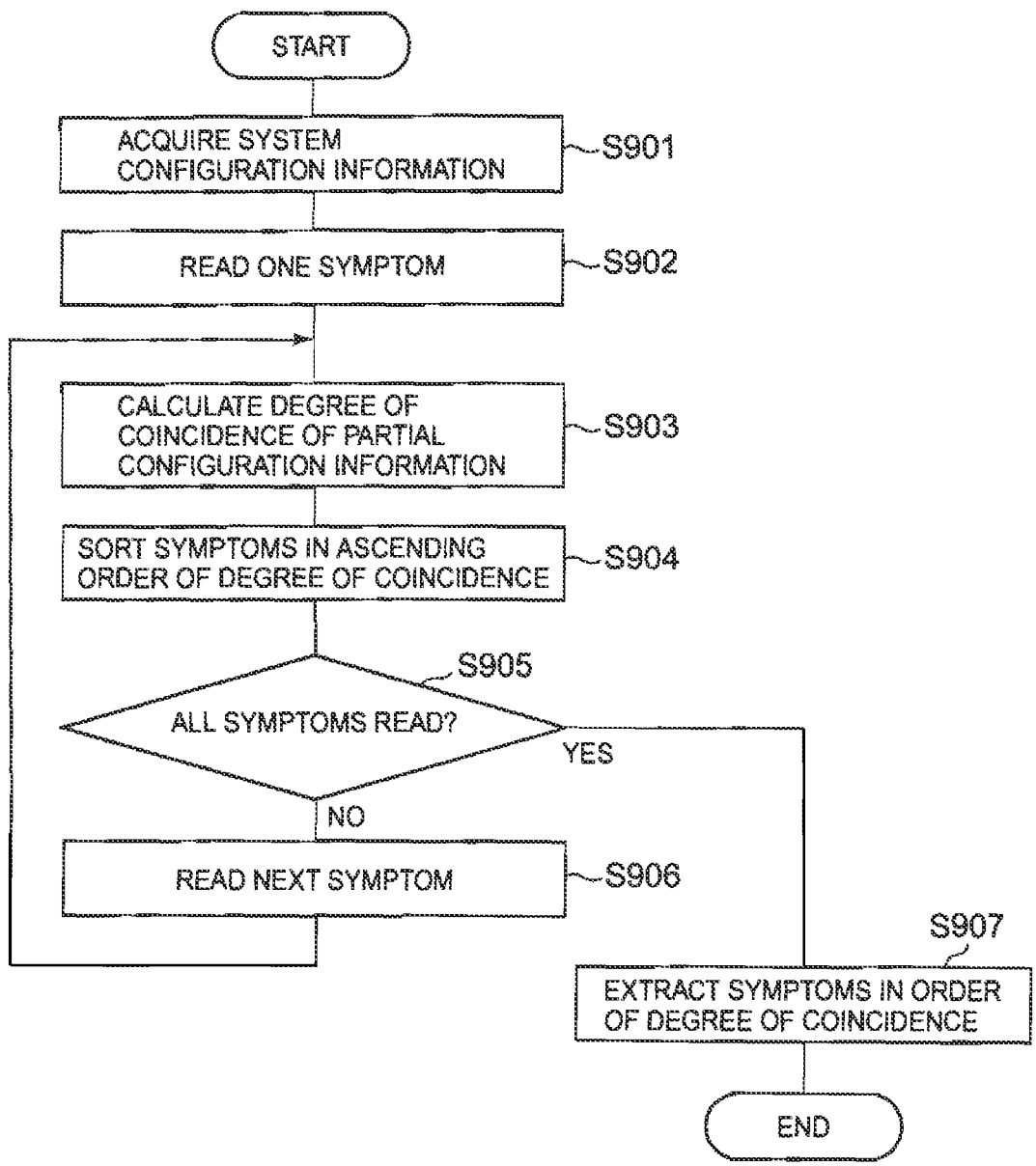
FIG. 9 is a flowchart showing a procedure of symptom extraction processing performed by the CPU of the failure event detecting apparatus according to an illustrative embodiment.

FIG. 9 is a flowchart showing a procedure of symptom extraction processing performed by the CPU 11 of the failure event detecting apparatus 1 according to an illustrative embodiment. The CPU 11 of the failure event detecting apparatus 1 acquires system configuration information including related information among components included in the monitoring target system 200 (step S901). Of course, the system configuration information may be acquired beforehand and prestored in the configuration information storing section 132.

The CPU 11 reads one symptom from the symptoms stored in the symptom database 131 (step S902), and calculates the degree of coincidence of partial configuration information added to the read symptom with the system configuration information (step S903). The method of calculating the degree of coincidence is not particularly limited, and one example method will be described later.

The CPU 11 sorts the symptoms in ascending order of degree of coincidence calculated (step S904), and determines whether all the stored symptoms are read (step S905). If determining that any symptom remains unread (NO in step S905), the CPU 11 reads the next symptom (step S906), and returns processing to step S903 to repeat the above-mentioned operations. On the other hand, if determining that all the symptoms are read (YES in step S905), the CPU 11 extracts the symptoms in order of degree of coincidence (step S907), and applies the symptoms to detection of a failure causing event.

Figure 10:
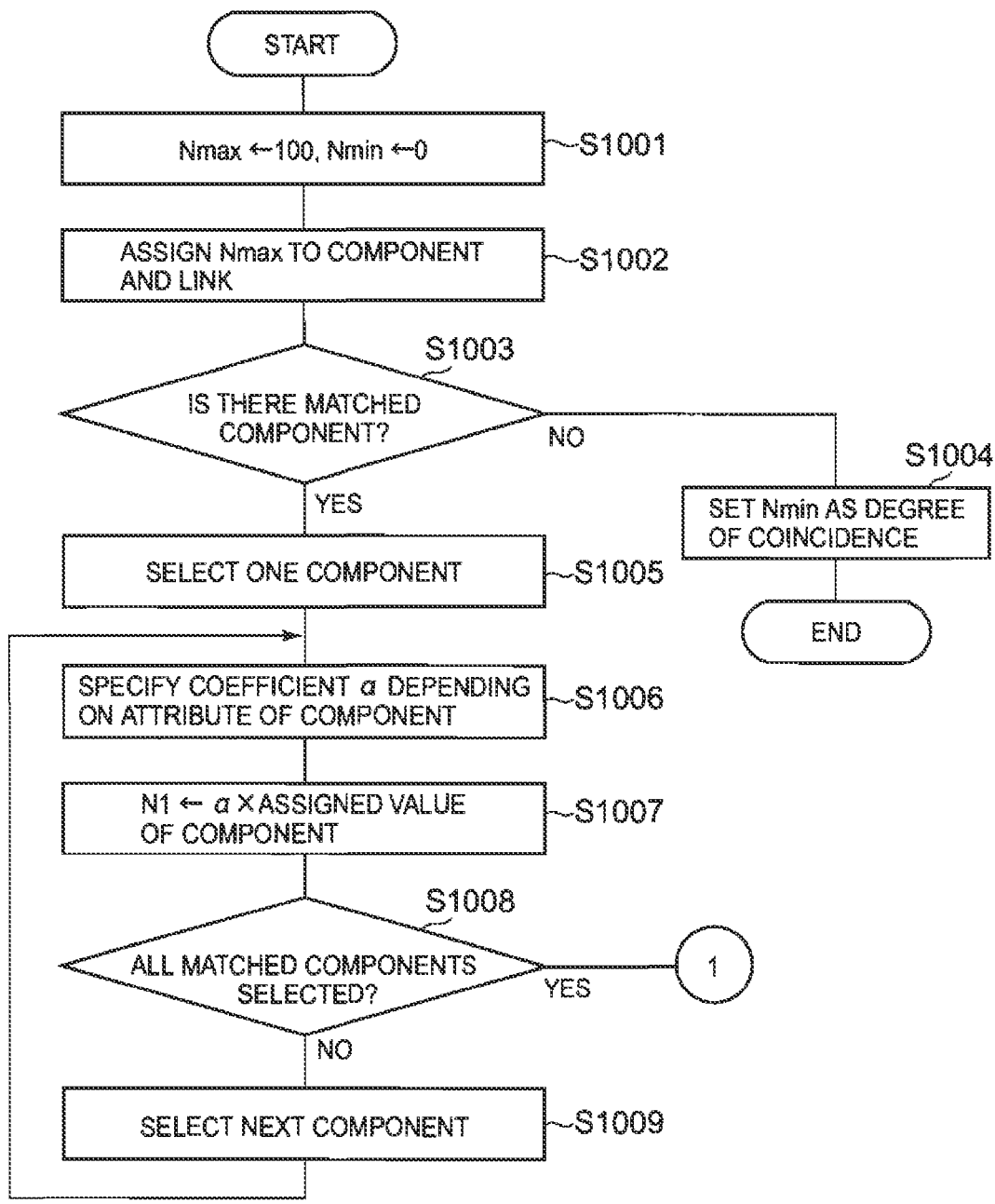
FIG. 10 is a flowchart showing a procedure of degree-of-coincidence calculation processing performed by the CPU of the failure event detecting apparatus according to an example embodiment.
Figure 11:
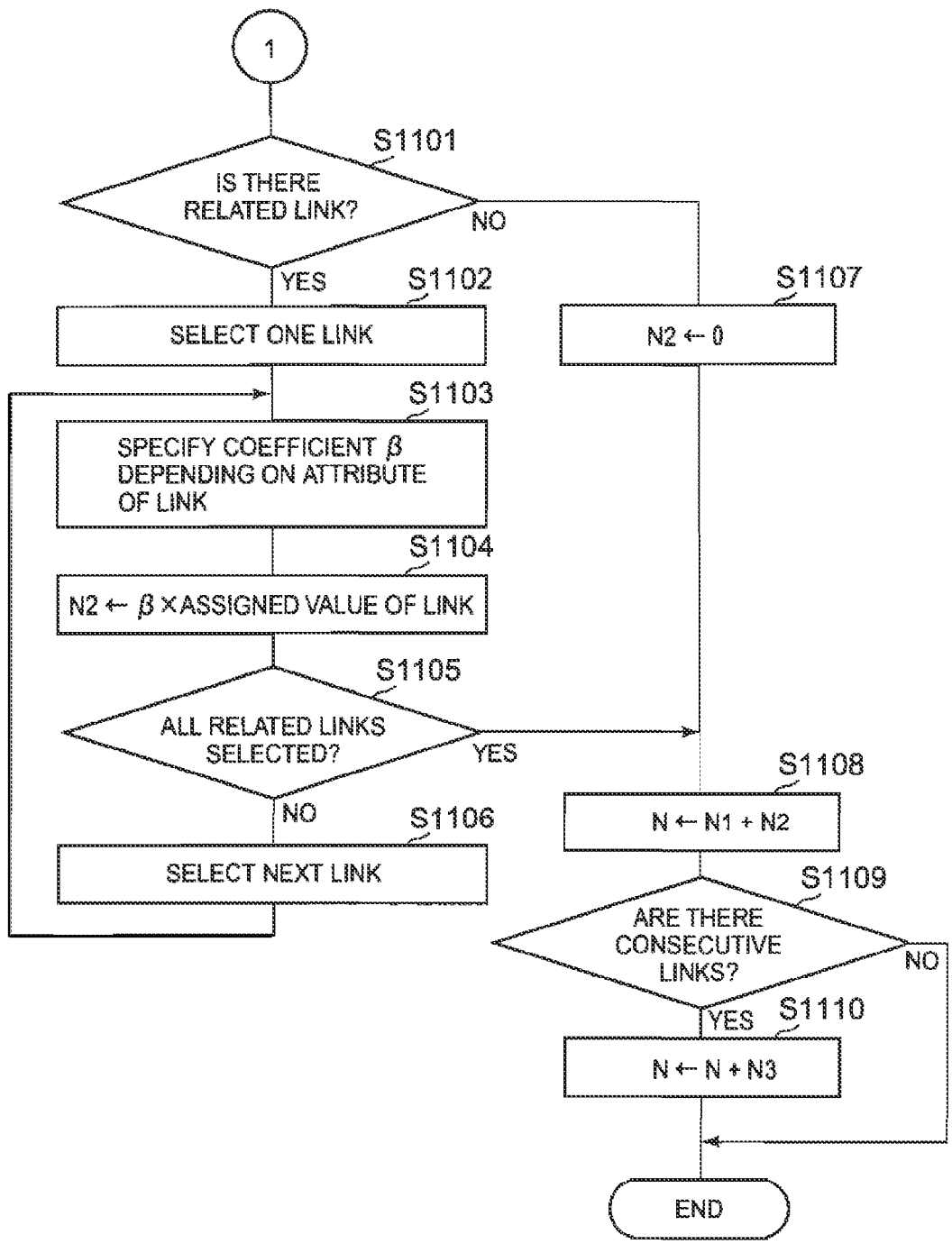
FIG. 11 is flowchart showing the procedure of degree-of-coincidence calculation processing performed by the CPU of the failure event detecting apparatus according to an example embodiment.

FIG. 10 and FIG. 11 are flowcharts showing a procedure of degree-of-coincidence calculation processing performed by the CPU 11 of the failure event detecting apparatus 1 according to an example embodiment. In FIG. 10, the CPU 11 of the failure event detecting apparatus 1 initializes the maximum Nmax and minimum Nmin of degree of coincidence (step S1001). In one embodiment, the Maximum Nmax may be set to 100 and the minimum Nmin is set to 0. The CPU 11 assigns the maximum Nmax to components and links included in the partial configuration information (step S1002). The level of importance of each component and link can be weighted depending on the assignment method.

The CPU 11 determines whether there is a component that matches any component included in the partial configuration information added to the read symptom (step S1003). If determining that there is no matched component (NO in step S1003), the CPU 11 sets the minimum Nmin as the degree of coincidence (step S1004), i.e., it sets the degree of coincidence to 0 (zero).

On the other hand, if determining that there is a matched component (YES in step S1003), the CPU 11 selects one component (step S1005). Then, the CPU 11 specifies a coefficient a by which an assigned value of the selected component is multiplied depending on the attribute of the component (step S1006). For example, the CPU 11 may specify the coefficient α in such a manner that if the type of component matches, α=0.1, if the product name of the component matches, α=0.6, if the version of the component is upward-compatible, α=0.8, or if the version of the component matches, α=1.0.

The CPU 11 multiplies the assigned value of the component by the coefficient α to determine the degree of coincidence, N1, of the components (step S1007). Then, the CPU 11 determines whether all matched components have been selected (step S1008). If determining that there is a component that is not selected yet (NO in step S1008), the CPU 11 selects the next component (step S1009), and returns processing to step S1006 to repeat the above-mentioned operations.

On the other hand, if determining that all matched components have been selected (YES in step S1008), the CPU 11 determines whether there is a related link as shown in FIG. 11 (step S1101). If determining that there is a related link (YES in step S1101), the CPU 11 selects one link (step S1102) to specify a coefficient β by which an assigned value of the selected link is multiplied depending on the attribute of the link (step S1103).

For example, the CPU 11 may specify the coefficient β in such a manner that if the link between components matches a required link that is essential for detection of the rule, β=1.0, if the required link exists indirectly, β=0.6, if the link is any link that may or may not exist, β=1.0, if any link exists indirectly, β=0.8, if a prohibited link that must not exist does not exist, β=1.0, if a prohibited link exists indirectly, β=0.1, if the type of link matches, β=1.0, or if it is compatible, β=0.8.

The CPU 11 multiplies the assigned value of the link by the coefficient β to determine the degree of coincidence, N2, of the links (step S1104). Then, the CPU 11 determines whether all related links have been selected (step S1105). If determining that there is a link that is not selected yet (NO in step S1105), the CPU 11 selects the next link (step S1106), and returns processing to step S1103 to repeat the abovementioned operations.

On the other hand, if determining that there is no related link (NO in step S1101), the CPU 11 sets the degree of coincidence, N2, of the links to 0 (zero) (step S1107), and advances processing to step S1108. If determining that all the links have been selected (YES in step S1105), the CPU 11 calculates the degree of coincidence, N, of the entire partial configuration information as the sum of the degree of coincidence, N1, of the components and the degree of coincidence, N2, of the links (step S1108), and determines whether there are consecutive links (step S1109).

If determining that there are consecutive links (YES in step S1109), the CPU 11 adds a predetermined evaluation value N3 to the degree of coincidence, N, of the entire partial configuration information (step S1110). On the other hand, if determining that there are no consecutive links (NO in step S1109), the CPU 11 skips step S1110 and ends the processing.

A method of calculating the above-mentioned, degree of coincidence will be described with reference to specific examples. It is assumed here that the partial configuration information that is the basis for calculating the degree of coincidence has two components, namely application server A and database B, and a link between application server A and database B. Like in FIG. 10 and FIG. 11, Nmax is set to 100, Nmin is set to 0, and the levels of importance among application server A, database B, and the link are set to 1:1:3. Therefore, the assigned value of application server A is 20, the assigned value of database B is 20, and assigned value of the link is 60, assigning Nmax to the degree of coincidence.

Figure 12:
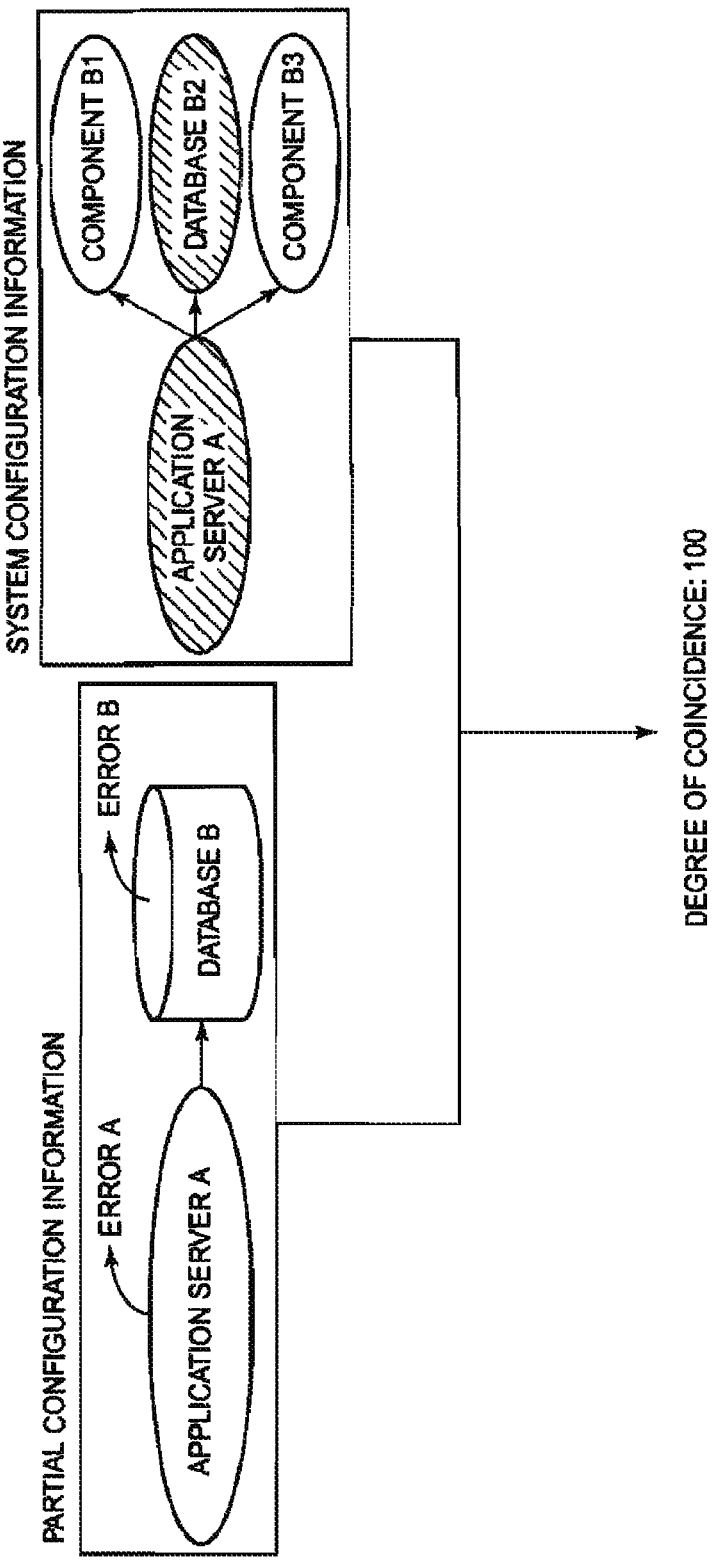
FIG. 12 is a schematic diagram showing a calculation example of the degree of coincidence when the same configuration as the partial configuration information exists in system configuration information in accordance with an example embodiment.

FIG. 12 is a schematic diagram showing a calculation example of the degree of coincidence when the same configuration as the partial configuration information exists in the system configuration information in accordance with an example embodiment. In the example of FIG. 12, since application server A and database B exist in the system configuration information as the same components, the degrees of coincidence of the components are "20," respectively, and since a link between application server A and database B exists, the degree of coincidence of the links is also "60." Therefore, the degree of coincidence, N, of the partial configuration information shown in FIG. 12 is set to 20+20+60=100.

Figure 13:
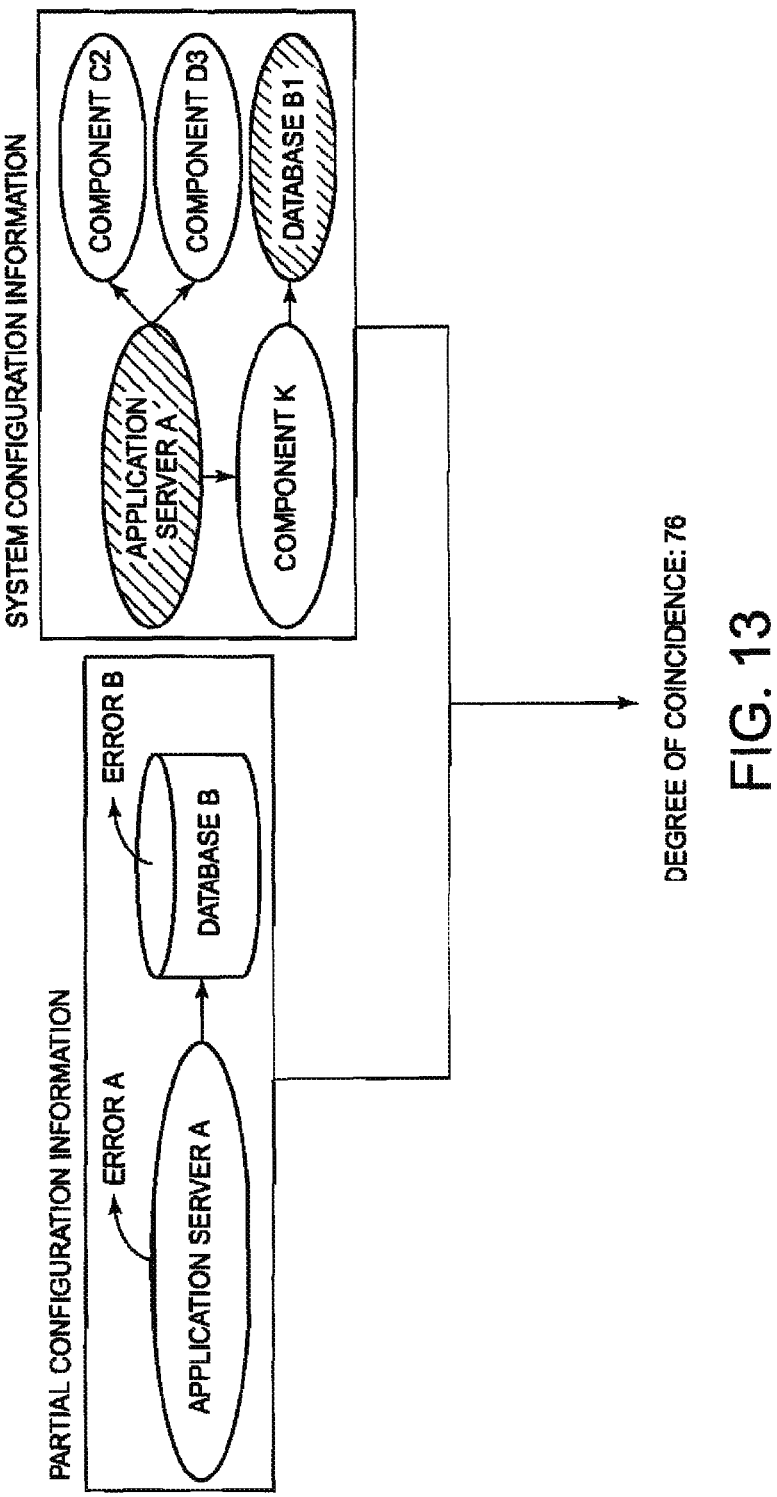
FIG. 13 is a schematic diagram showing another calculation example of the degree of coincidence when a link of the partial configuration information exists indirectly in the system configuration information in accordance with an example embodiment.

FIG. 13 is a schematic diagram showing another calculation example of the degree of coincidence when the link of the partial configuration information exists indirectly in the system configuration information in accordance with an example embodiment. In the example of FIG. 13, since application server A and database B1 exist in the system configuration information as the same components, the degrees of coincidence of the components are "20," respectively. However, since the link between application server A and database B is an indirect link through component K, the degree of coincidence, N2, of the links is set to 0.6×60=36. Therefore, the degree of coincidence, N, of the partial configuration information shown in FIG. 13 is set to 20+20°36=76.

Figure 14:
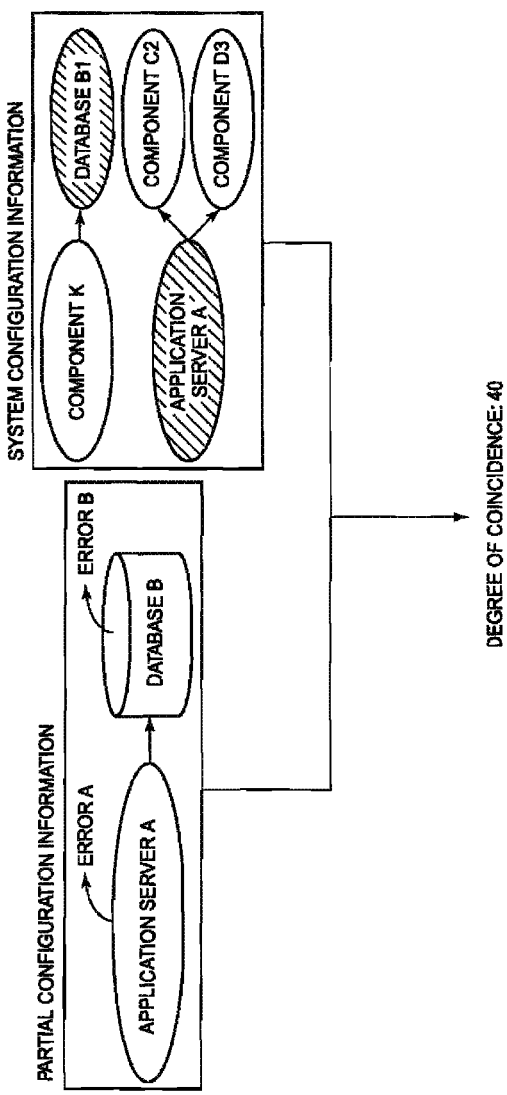
FIG. 14 is a schematic diagram showing still another calculation example of the degree of coincidence when the same components as those of the partial configuration information exist but no link exists in accordance with an example embodiment.

FIG. 14 is a schematic diagram showing still another calculation example of the degree of coincidence when the same components as those of the partial configuration information exist but no link exists in accordance with an example embodiment. In the example of FIG. 14, since application server A and database B1 exist in the system configuration information as the same components, the degrees of coincidence of the components are "20," respectively. However, since no link exists between application server A and database B1, the degree of coincidence of the links is set to "0." Therefore, the degree of coincidence, N, of the partial configuration information shown in FIG. 14 is set to 20+20+0=40.

Figure 15:
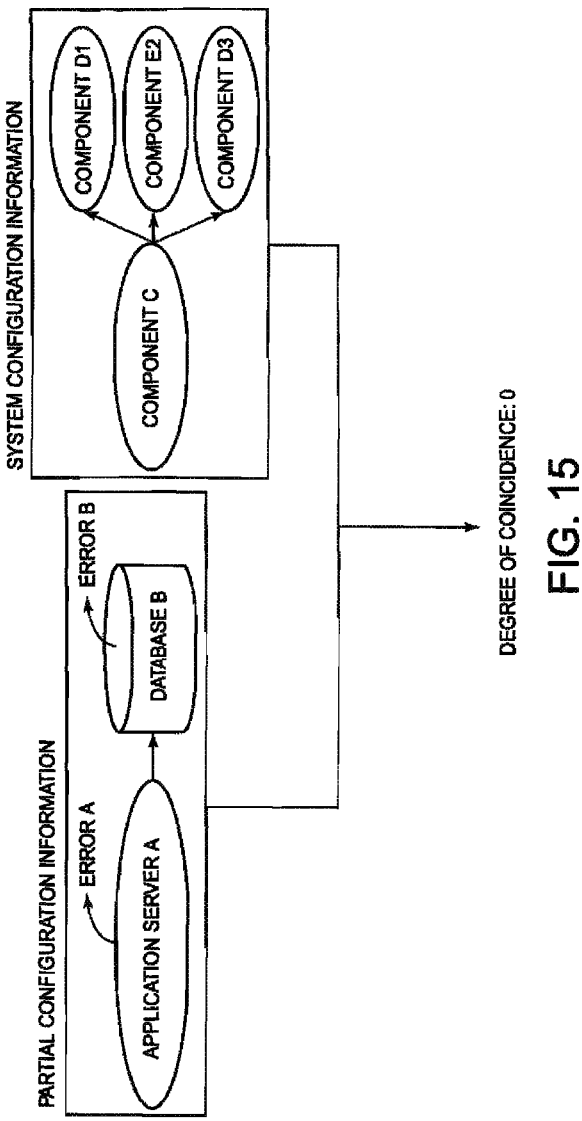
FIG. 15 is a schematic diagram showing yet another calculation example of the degree of coincidence when the same components as those of the partial configuration information do not exist in accordance with an example embodiment.

FIG. 15 is a schematic diagram showing yet another calculation example of the degree of coincidence when the same components as those of the partial configuration information do not exist in accordance with an example embodiment. In the example of FIG. 15, since the same components do not exist in the system configuration information, the degrees of coincidence of the components are "0," respectively. Of course, since the link between application server A and database B does not exist, the degree of coincidence of the links is also set to "0." Therefore, the degree of coincidence, N, of the partial configuration information shown in FIG. 15 is set to 0.

Thus, according to the embodiment described above, the acquired system configuration information is compared with the partial configuration information added to each of the symptoms and stored, and a symptom corresponding to partial configuration information whose calculated degree of coincidence is high is applied to detection of an event that has caused a failure, so that a root cause of occurrence of the failure can be identified efficiently without applying unnecessary symptoms.

Since the hardware configuration of a failure event detecting apparatus 1 including an apparatus for supporting detection of a failure event according to another alternative embodiment is the same as that of the above described embodiments, the detailed description thereof will be omitted by attaching the same reference numerals to denote the same elements. The alternative embodiment differs from the embodiments described above in that this embodiment calculates the goodness of fit of the extracted partial configuration information to partial configuration information included in a symptom used to specify an event group to evaluate the detection results of the symptoms.

Figure 16:
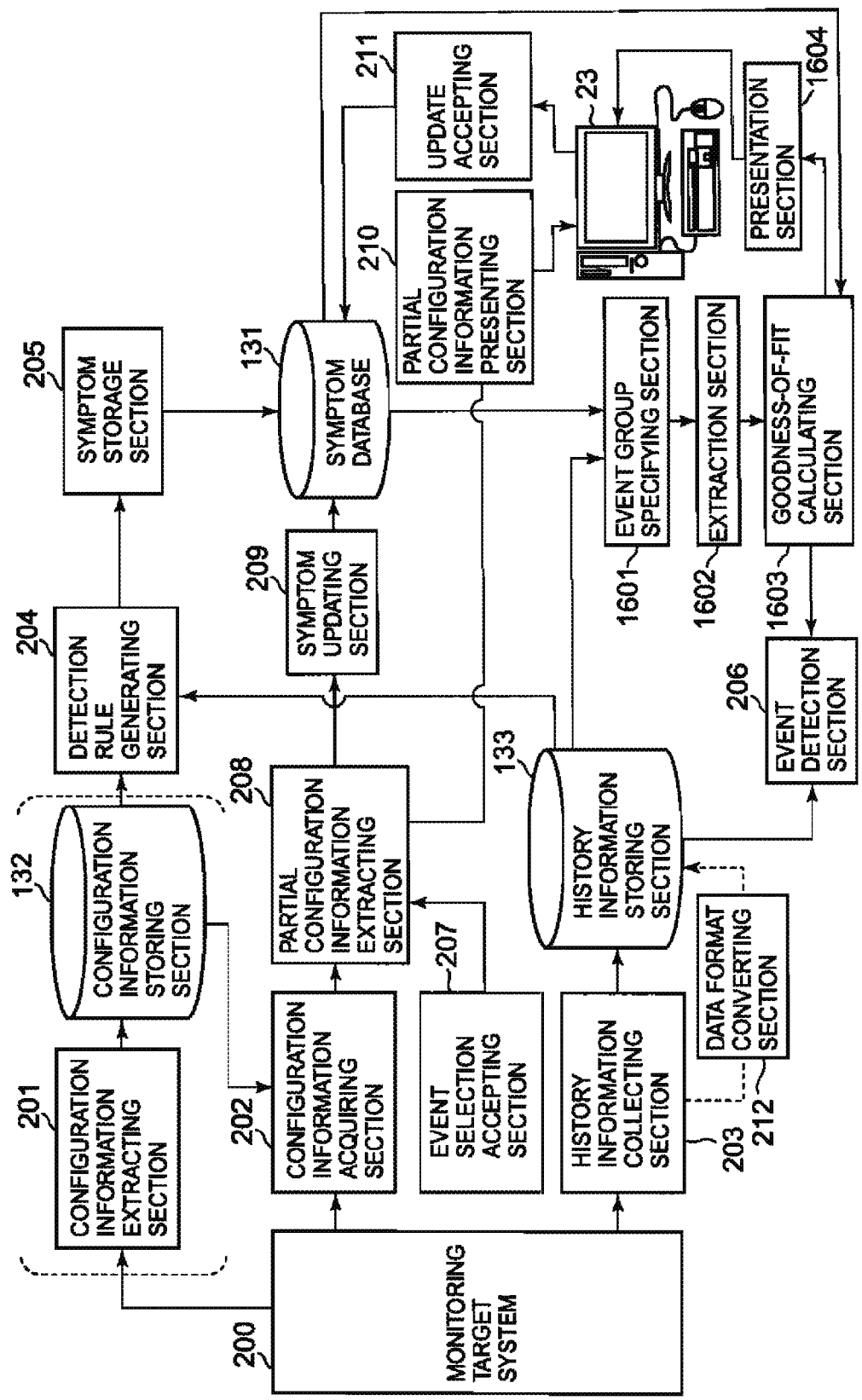
FIG. 16 is a functional block diagram of a failure event detecting apparatus according to an illustrative embodiment.

FIG. 16 is a functional block diagram of a failure event detecting apparatus 1 according to an illustrative embodiment. The configuration information extracting section 201 extracts system configuration information including related information among components included in the monitoring target system 200, and stores it in the configuration information storing section 132. The system configuration information including the related information among components includes, for example, information on the relation of connections among components in communication, link related information related to an operating/non-operating relationship, etc. Note that the configuration information extracting section 201 is not a structural element indispensable to the illustrative embodiments, and the system configuration information may be generated beforehand in the configuration information storing section 132, or may not be incorporated in the failure event detecting apparatus 1. In other words, the configuration information extracting section 201 and the configuration information storing section 132 are not structural elements indispensable to the failure event detecting apparatus 1 according to the illustrative embodiment.

The configuration information acquiring section 202 acquires the system configuration information stored in the configuration information storing section 132. The system configuration information is stored in the configuration information storing section 132 in association with each monitoring target system 200, and the configuration information acquiring section 202 acquires corresponding system configuration information according to the monitoring target system 200.

The history information collecting section 203 monitors the monitoring target system 200 at all times, collects history information including log information output from each component included in the monitoring target system 200 and/or failure information such as event information output upon occurrence of a failure, and stores the history information in the history information storing section 133. The log information is not limited to system logs output at all times, and it may include message information output by interrupt processing or the like at the time of failure occurrence.

Note that the pieces of history information collected by the history information collecting section 203 are often different in data format so that they may not be able to be used as they are as basic information for identifying events as candidates for an event that has caused a failure. Therefore, it is desirable to convert the pieces of history information into a standard unified data format and store them in the history information storing section 133.

The detection rule generating section 204 generates a detection rule for detecting an event included in a component related to the failure that has occurred. The symptom storage section 205 stores a symptom with certain additional information added to the generated detection rule. As the additional information, information related to recommended actions at the time of failure detection and the like, message information including various comments, etc. are added.

The event selection accepting section 207 accepts selection of the event, included in the component related to the failure that has occurred, as selection from the event list or the like, for example. The partial configuration information extracting section 208 extracts, from the system configuration information acquired by the configuration information acquiring section 202, partial configuration information as the system configuration information related to the component that sent out the event the selection of which has been accepted by the event selection accepting section 207. The partial configuration information to be extracted includes related information including dependencies between the component which, among the components constructing the system, sent out the event the selection of which has been accepted as a failure causing event, and other components. For example, related information between an application server and a database, both being components, link information, etc. are included.

The structure of the symptom including the partial configuration information in the failure event detecting apparatus 1 according to the depicted embodiment is the same as the structure shown in FIG. 3(*b*) according to the embodiments described above. In other words, information related to a dependency between application server A and database B, both being components, is added to a conventional symptom, so that the dependency between components can be considered as the symptom for detecting a failure causing event in which, thereby making it possible to more improve the detection accuracy of the failure causing event.

The symptom updating section 209 adds the partial configuration information extracted by the partial configuration information extracting section 208 to a corresponding symptom, and stores it. In other words, the partial configuration information becomes additional information. The partial configuration information presenting section 210 presents, to the display device 23, the partial configuration information extracted by the partial configuration information extracting section 208. The update accepting section 211 accepts an update of the presented partial configuration information. This allows the user to change the presented partial configuration information to a desired structure in order to generate suitable partial configuration information without fail.

Since the screen 80 presented on the display device 23 by means of the partial configuration information presenting section 210 is the same as that in the alternative embodiment described above, the detailed description thereof will be omitted.

Based on the pieces of history information collected by the history information collecting section 203 and the symptoms stored in the symptom database 131, an event group specifying section 1601 specifies an event group that fits each of the stored symptoms. An extraction section 1602 extracts partial configuration information including related information between each of the components, which sent out each of the event groups specified by the event group specifying section 1601, and other components.

A goodness-of-fit calculating section 1603 calculates the goodness of fit of the partial configuration information extracted by the extraction section 1602 to partial configuration information included in each of the symptoms stored in the symptom database 131 and used by the event group specifying section 1601 to specify the event groups. If a symptom having a high goodness of fit is detected, it can be determined that the possibility of a false positive for an event that has caused a failure is low. Further, the event that has caused the failure can be detected with a certain degree of accuracy without being dependent on the level of skill needed for the user to apply a symptom. In other words, the event detection section 206 applies a symptom having a high goodness-of-fit value to detect the event that has caused the failure, so that the possibility of a false positive for the event that has caused the failure can be reduced, thereby making it possible to improve the detection accuracy of the failure causing event.

A presentation section 1604 presents, to the display device 23, each of the applied symptoms, partial configuration information added to the symptom, and the calculated goodness of fit of the symptom. Thus, the results of applying the symptoms are presented not only in order of application but also in order of goodness of fit, so that the possibility of displaying, on the display device 23, false positives as the results of detection of the failure causing event can be reduced, making if possible to display the symptoms sequentially in order of event detection accuracy.

Figure 17:
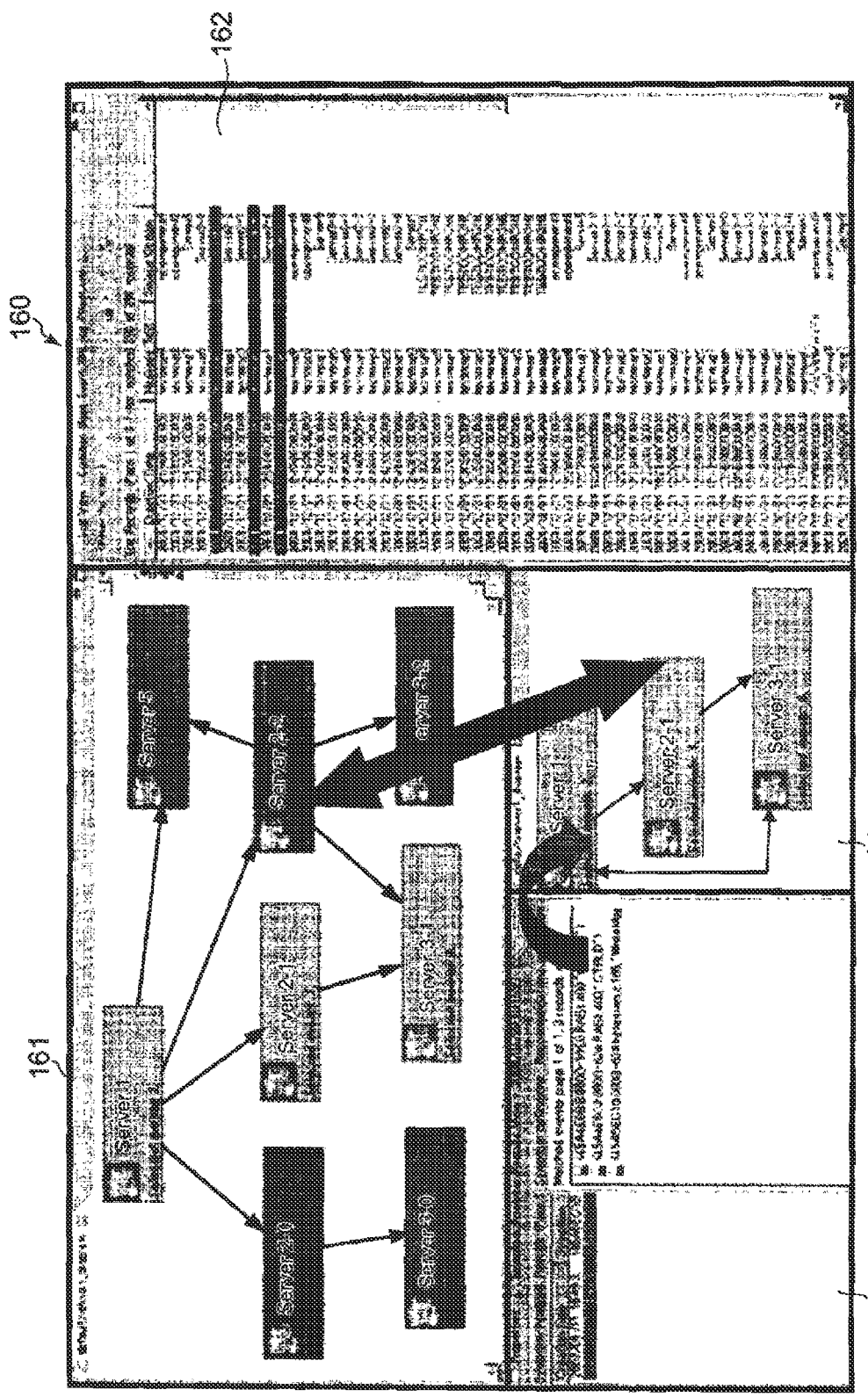
FIG. 17 is an illustration of a screen presented on the display device by means of a presentation section in accordance with an example embodiment.

FIG. 17 is an illustration of a screen 160 presented on the display device 23 by means of the presentation section 1604 in accordance with an example embodiment. Displayed in a topology diagram displaying area 161 is a topology diagram showing dependencies among components included in the monitoring target system 200. In an event list displaying area 162, events included in the monitoring target system 200 are listed. When the event selection accepting section 207 accepts selection of an event, included in a component related to a failure that has occurred, from among the group of events displayed in the event list displaying area 162, the event the selection of which has been accepted and events having dependencies are highlighted. In FIG. 17, the event the selection of which has been accepted and the events having dependencies are displayed by changing the display color. The highlighting method is not particularly limited, and brightness may be changed.

In a symptom list displaying area 163, symptoms detected based on detection rules are listed, and in a partial configuration information displaying area 164, partial configuration information added to an applied symptom is displayed. The partial configuration information displayed in the partial configuration information displaying area 164 is collated with the partial configuration information displayed in the topology diagram displaying area 161 in response to acceptance of the selection of an event group to calculate the goodness of fit. The calculated goodness of fit is presented in a field of a corresponding symptom of the symptom list displaying area 163.

Figure 18:
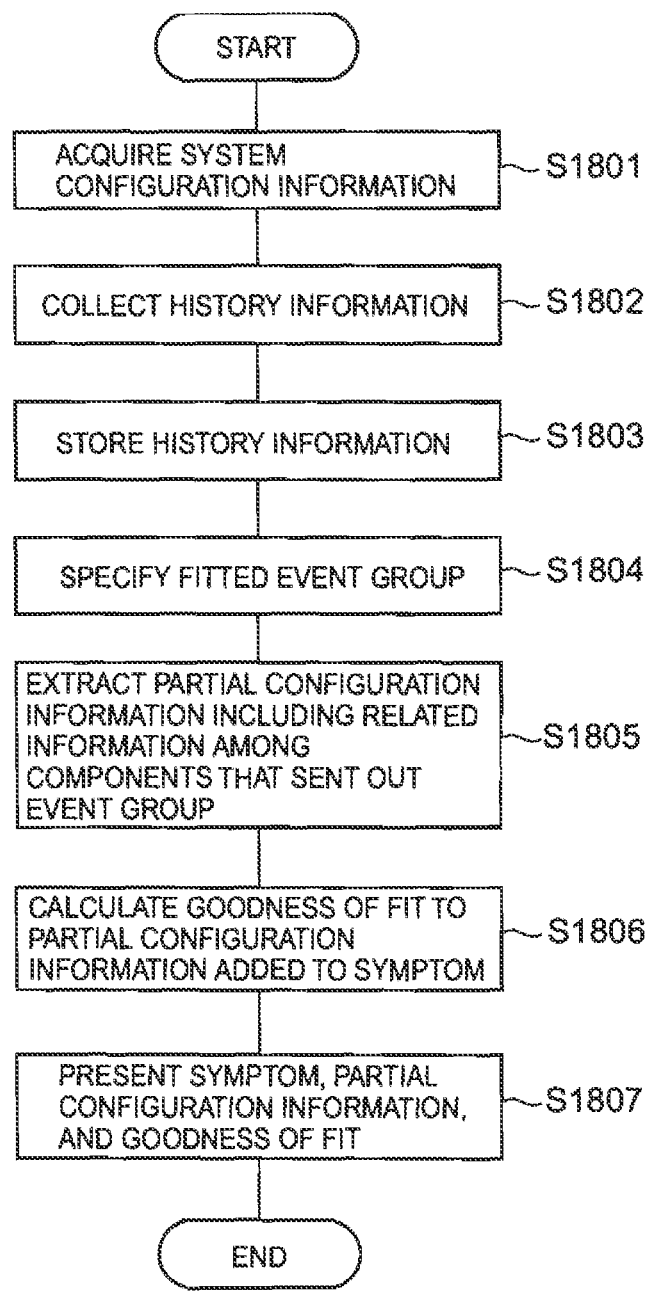
FIG. 18 is a flowchart showing a procedure of failure detection processing performed by the CPU of the failure event detecting apparatus according to an illustrative embodiment.

FIG. 18 is a flowchart showing a procedure of failure detection processing performed by the CPU 11 of the failure event detecting apparatus 1 according to Embodiment 3 of the present invention in accordance with an example embodiment. The CPU 11 of the failure event detecting apparatus 1 acquires system configuration information including related information among components included in the monitoring target system 200 (step S1801). Of course, the system configuration information may be acquired beforehand and pre-stored in the configuration information storing section 132.

The CPU 11 collects pieces of history information including log information of the monitoring target system 200 and/or failure information output from each component upon occurrence of a failure (step S602), and stores them in the history information storing section 133 (step S1803). Based on the collected pieces of history information and the symptoms stored in the symptom database 131, the CPU 11 specifies an event group that fits each of the stored symptoms (step S1804).

Then, the CPU 11 extracts partial configuration information including related information between each of the components, which sent out each of the specified event groups, and other components (step S1805), and calculates the goodness of fit of the extracted partial configuration information to the partial configuration information added to the symptom stored in the symptom database 131 and applied to specify the event group (step S1806). The method of calculating the goodness of fit is not particularly limited, and one exemplary method will be described later.

The CPU 11 presents, to the display device 23, each of the applied symptoms, partial configuration information added to the symptom, and the calculated goodness of fit of the symptom (step S1807). This allows the user to visually check the results presented in order of goodness of fit of symptoms.

Figure 19:
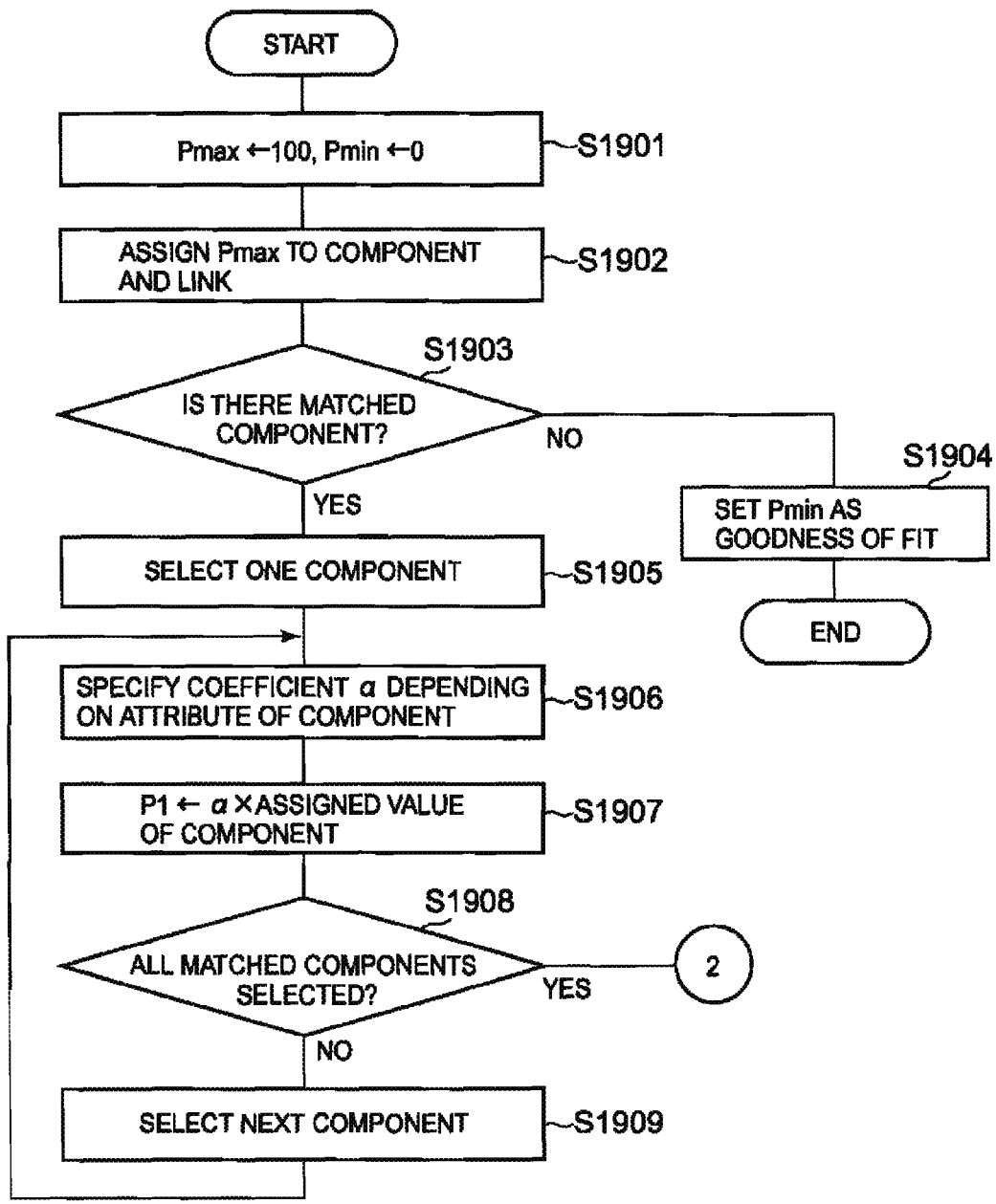
FIG. 19 is a flowchart showing a procedure of goodness-of-fit calculation processing performed by the CPU of the failure event detecting apparatus according to an illustrative embodiment.
Figure 20:
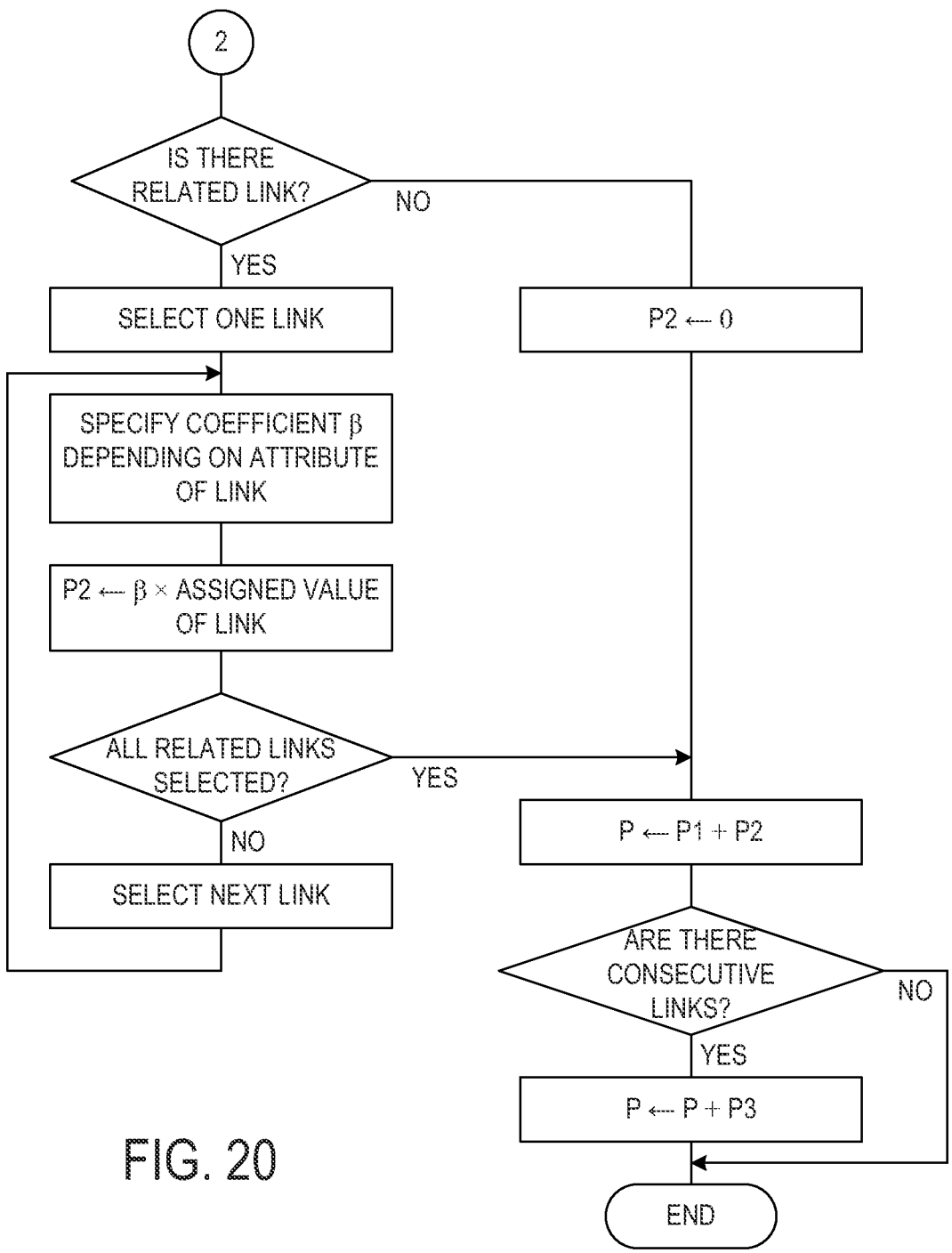
FIG. 20 is a flowchart showing the procedure of goodness-of-fit calculation processing performed by the CPU of the failure event detecting apparatus according to an illustrative embodiment.

FIG. 19 and FIG. 20 are flowcharts showing a procedure of goodness-of-fit calculation processing performed by the CPU 11 of the failure event detecting apparatus 1 according to an example embodiment. In FIG. 19, the CPU 11 of the failure event detecting apparatus 1 initializes the maximum Pmax and Minimum Pmin of goodness of fit (step S1901). In the depicted example, the maximum Pmax is set to 100 and the minimum Pmin is set to 0. The CPU 11 assigns the maximum Pmax to components and links included in the partial configuration information (step S1902). The level of importance of each component and link can be weighted depending on the assignment method.

The CPU 11 determines whether there is a component that matches any component included in the partial configuration information added to the read symptom (step S1903). If determining that there is no matched component (NO in S1903), the CPU 11 sets the minimum Pmin as the goodness of fit (step S1904), i.e., it sets the goodness of fit to 0 (zero).

If determining that there is at least one matched component (YES in step S1903), the CPU 11 selects one component (step S1905). Then, the CPU 11 specifies a coefficient α by which an assigned value of the selected component is multiplied according to the attribute of the component (step S1906). For example, the CPU 11 may specify the coefficient α in such a manner that if the type of component matches, $\alpha=0.1$, if the product name of the component matches, $\alpha=0.6$, if the version of the component is upward-compatible, $\alpha=0.8$, or if the version of the component matches, $\alpha=1.0$.

The CPU 11 multiplies the assigned value of the component by the coefficient α to determine the goodness of fit, P1, of the components (step S1907). Then, the CPU 11 determines whether all matched components have been selected (step S1908). If determining that there is a component that is not selected yet (NO in step S1908), the CPU 11 selects the next component (step S1909), and returns processing to step S1006 to repeat the above-mentioned operations.

On the other hand, if determining that all matched components have been selected (YES in step S1908), the CPU 11 determines whether there is a related link as shown in FIG. 20 (step S2001). If determining that there is a related link (YES in step S2001), the CPU 11 selects one link (step S2002) to specify a coefficient β by which an assigned value of the selected link is multiplied according to the attribute of the link (step S2003).

For example, the CPU 11 may specify the coefficient β in such a manner that if the link between components matches a required link that is essential for detection of the rule, $\beta=1.0$, if the required link exists indirectly, $\beta=0.6$, if the link is any link that may or may not exist, $\beta=1.0$, if any link exists indirectly, $\beta=0.8$, if a prohibited link that must not exist does not exist, $\beta=1.0$, if a prohibited link exists indirectly, $\beta=0.1$, if the type of link matches, $\beta=1.0$, or if it is compatible, $\beta=0.8$.

The CPU 11 multiplies the assigned value of the link by the coefficient β to calculate the goodness of fit, P2, of the link (step S2004). Then, the CPU 11 determines whether all related links have been selected (step S2005). If determining that there is a link that is not selected yet (NO in step S2005), the CPU 11 selects the next link (step S2006), and returns processing to step S2003 to repeat the abovementioned operations.

If determining that there is no related link (NO in step S2001), the CPU 11 sets the goodness of fit, P2, of the link to 0 (zero) (step S2007), and advances processing to step S2008. If determining that all related links have been selected (YES in step S2005), the CPU 11 calculates the goodness of fit, P, of the entire partial configuration information as the sum of the goodness of fit, P1, of the components and the goodness of fit, P2, of the links (step S2008) to determine whether there are consecutive links (step S2009).

If determining that there are consecutive links (YES in step S2009), the CPU 11 adds a predetermined evaluation value P3 to the goodness of fit, P, of the entire partial configuration information (step S2010). On the other hand, if determining that there are no consecutive links (NO in step S2009), the CPU 11 skips step S2010 and ends the processing.

A method of calculating the above-mentioned goodness of fit will be described with reference to specific examples. It is assumed here that the partial configuration information added to the symptom that is the basis for calculating the goodness of fit has two components, namely application server A and database B, and a link between application server A and database B. Like in FIG. 19 and FIG. 20, Pmax is set to 100, Pmin is set to 0, and the levels of importance among application server A, database B, and the link are set to 1:1:3. Therefore, the assigned value of application server A is 20, the assigned value of database B is 20, and assigned value of the link is 60, assigning Pmax to the goodness of fit.

Figure 21:
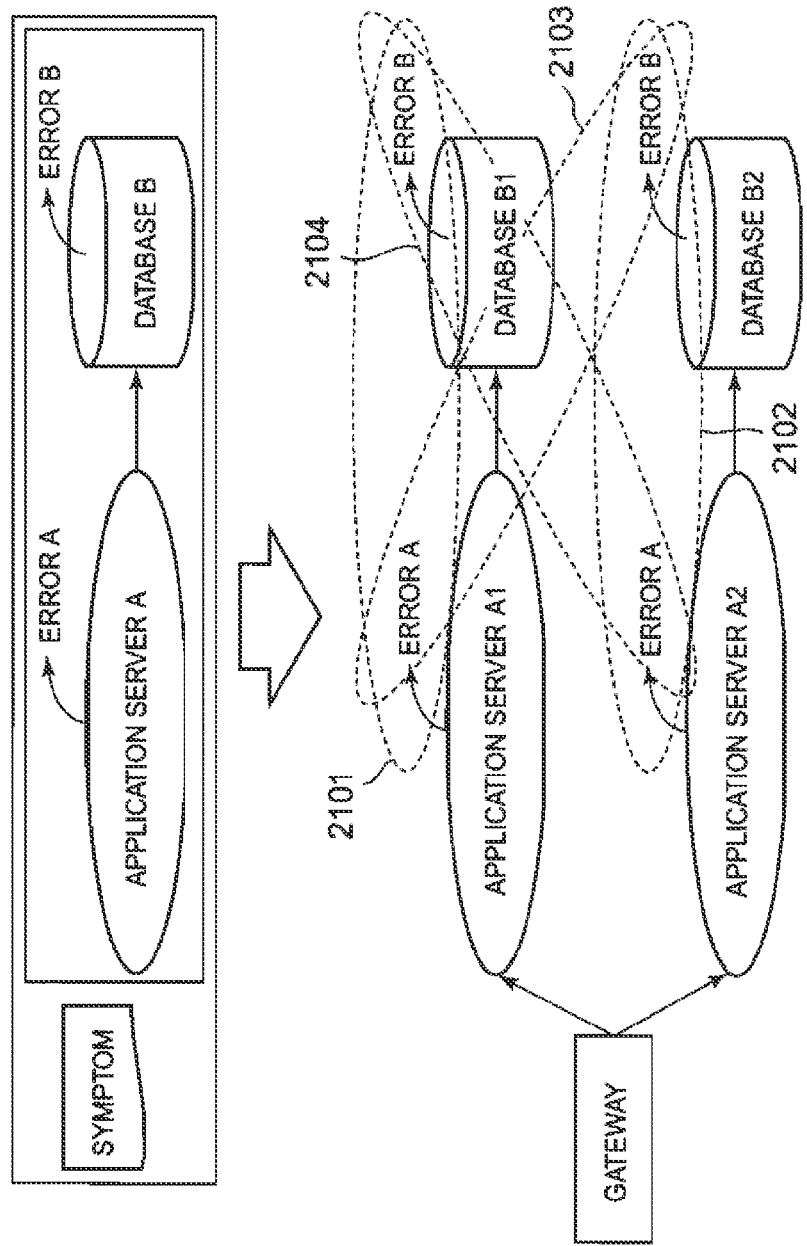
FIG. 21 is a schematic diagram for explaining the concept of the goodness of fit between partial configuration information added to a symptom and system configuration information in accordance with an example embodiment.

FIG. 21 is a schematic diagram for explaining the concept of the goodness of fit of the partial configuration information added to the symptom to the system configuration information in accordance with an example embodiment. It is assumed that two links between application server A1 and database B1, and application server A2 and database B2 exist in the system configuration information, and the link attribute of both are identical to the link attribute between application server A and database B, respectively.

In this case, since link 2101 between application server A1 and database B1, and link 2102 between application server A2 and database B2 have the same attribute as the partial configuration information added upon symptom generation, both are determined to be similar. Therefore, in this case, the goodness of fit is determined to be a large value.

On the other hand, link 2103 between application server A1 and database B2, and link 2104 between application server A2 and database B1 match in component attribute, but are different in link attribute from the partial configuration information added upon symptom generation. Therefore, in this case, the goodness of fit P is determined to be a small value.

Figure 22:
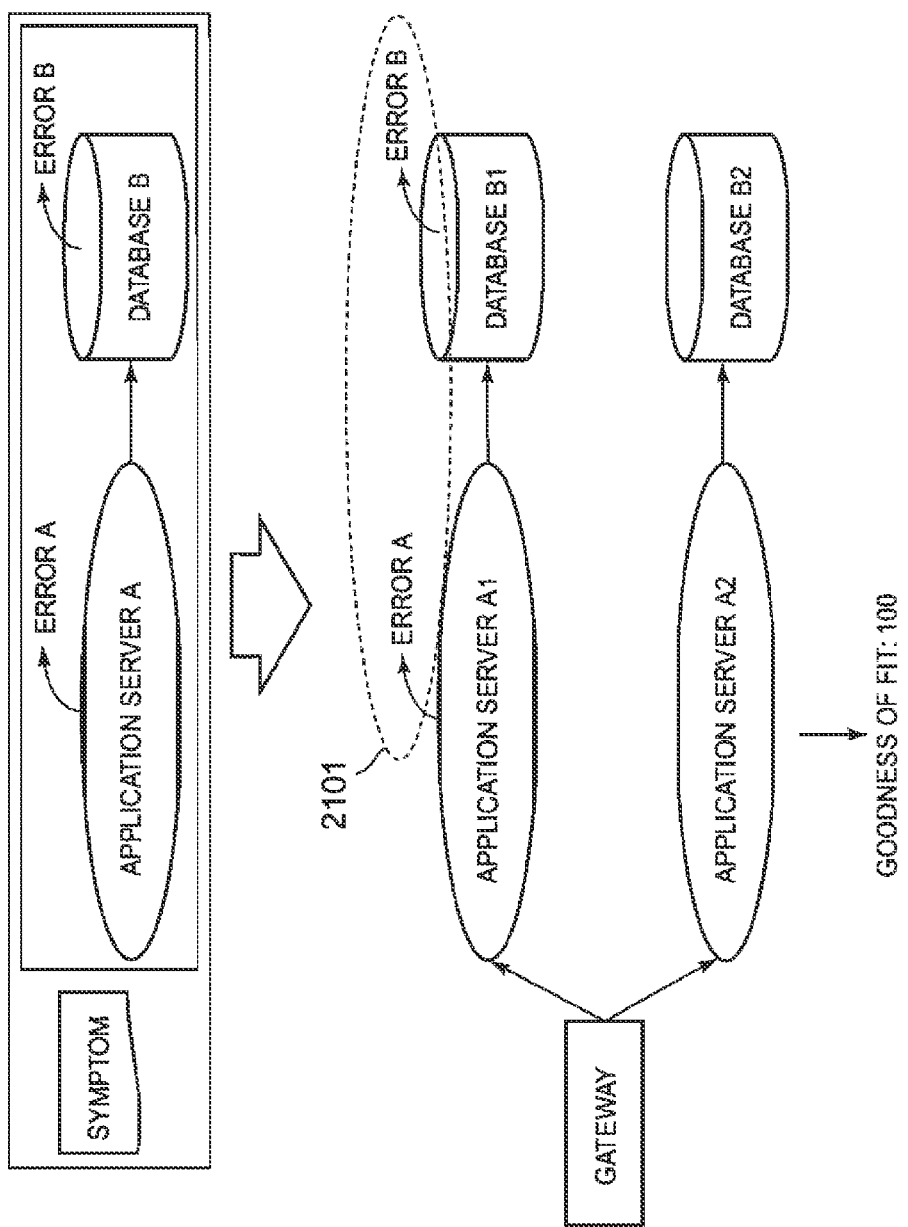
FIG. 22 is a schematic diagram showing a calculation example of the goodness of fit when the same configuration as partial configuration information added upon symptom generation exists in the system configuration information in accordance with an example embodiment.

FIG. 22 is a schematic diagram showing a calculation example of the goodness of fit when the same configuration as the partial configuration information added upon symptom generation exists in the system configuration information in accordance with an example embodiment. In the example of FIG. 22, since application server A1 and database B1, and the application server A2 and database B2 exist as the same components, the goodness-of-fit values are "20," respectively, and link 2101 between application server A1 and database B1 exist as having the same link attribute as the link between application server A and database B. Therefore, the goodness of fit of the links is set to "60," so that the goodness of fit, P, of the partial configuration information shown in FIG. 22 is set to 20+20+60=100.

Figure 23:
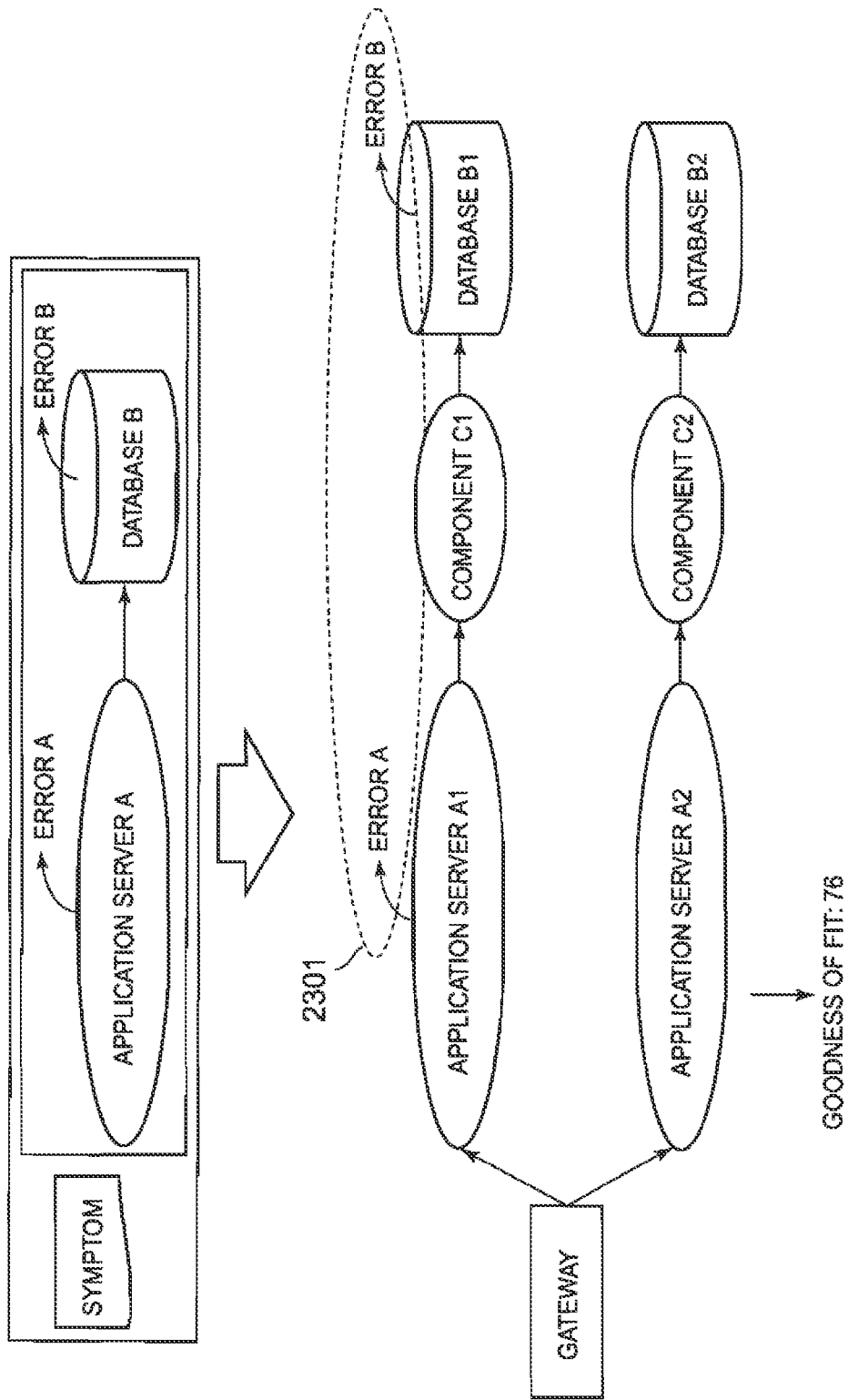
FIG. 23 is a schematic diagram showing another calculation example of the goodness of fit when a link of partial configuration information added upon symptom generation indirectly exists in the system configuration information in accordance with an example embodiment.

FIG. 23 is schematic diagram showing another calculation example of the goodness of fit when the link of the partial configuration information added upon symptom generation indirectly exists in the system configuration information in accordance with an example embodiment. In the example of FIG. 23, since application server A1 and database B1, and application server A2 and database B2 exist as the same components, the goodness-of-fit values of the components are "20," respectively. On the other hand, though any link having the same attribute as the link between application server A and database B does not exist, link 2301 to connect application server A1 and database B1 through another component C1 exists. Therefore, the goodness of fit, P2, of these links is set to 0.6×60=36, and the goodness of fit, P, of the partial configuration information shown in FIG. 23 is set to 20+20+36=76.

Figure 24:
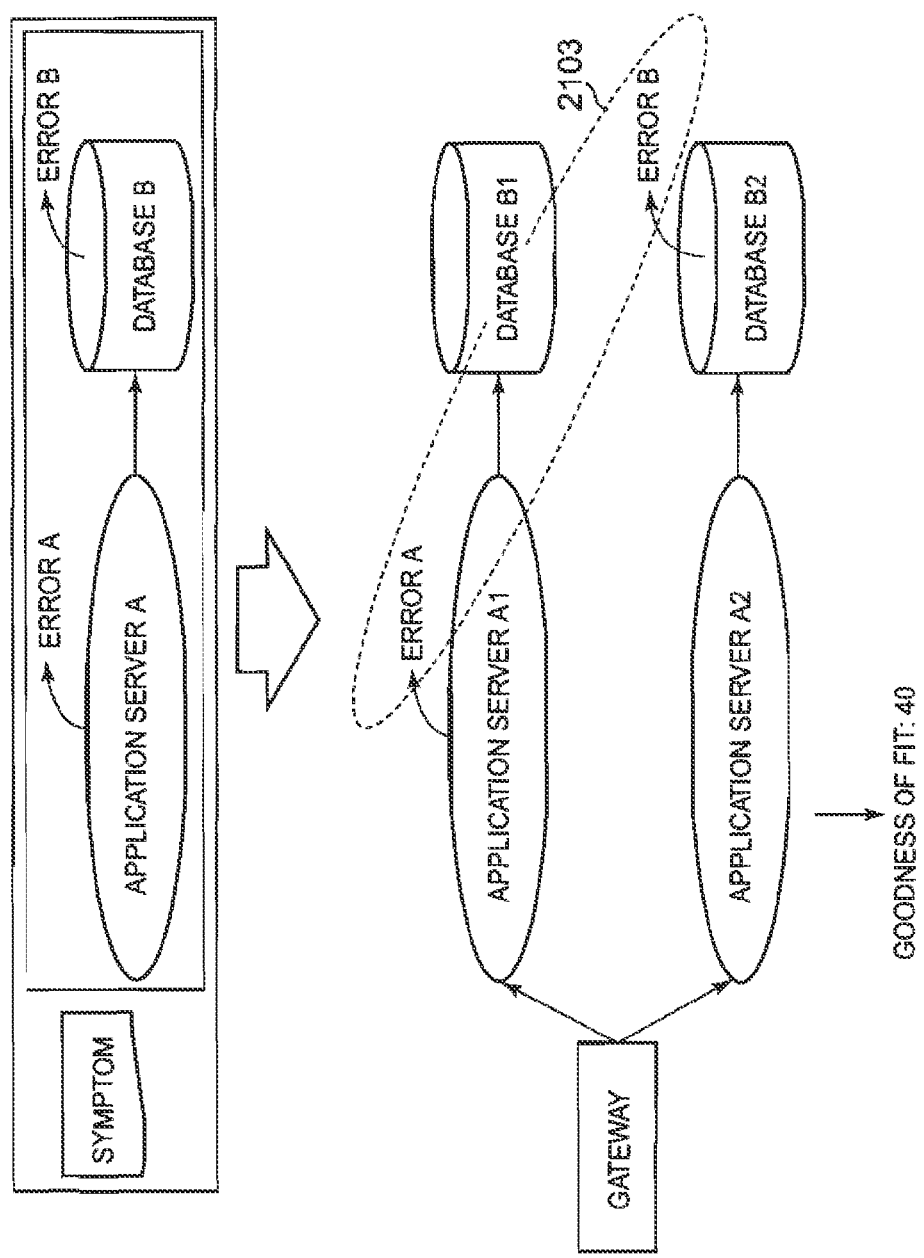
FIG. 24 is a schematic diagram showing still another calculation example of the goodness of fit when the same components as those of the partial configuration information added upon symptom generation exist but no link exists in accordance with an example embodiment.

FIG. 24 is a schematic diagram showing still another calculation example of the goodness of fit when the same components as those of the partial configuration information added upon symptom generation exist but no link exists in accordance with an example embodiment. In the example of FIG. 24, since application server A1 and database B1, and application server A2 and database B2 exist as the same components, the goodness-of-fit values of the components are "20," respectively. On the other hand, any link having the same attribute as the link between application server A and database B does not exist, and link 2103 between application server A1 and database B2 exists. Therefore, the goodness of fit, P2, of these links is set to 0, so that the goodness of fit, P, of the partial configuration information shown in FIG. 24 is set to 20+20+0=40.

Thus, according to the depicted embodiment, since the goodness of fit of the extracted partial configuration information to the partial configuration information included in the symptom applied to specifying the event group can be calculated while maintaining a high degree of detection accuracy of an event that has caused a failure by adding the partial configuration information to the symptom, objectively detected results can be evaluated without being dependent on the level of skill of the user. Further, since the calculated goodness of fit can also be presented together with the partial configuration information, the detected results can be objectively evaluated without being dependent on the level of skill of the user.

Since the hardware configuration of a failure event detecting apparatus 1 including an apparatus for supporting detection of a failure event according to yet another alternative embodiment of the present invention is the same as that of the embodiments described above, the detailed description thereof will be omitted by attaching the same reference numerals to denote the same elements. This embodiment differs from the previously described embodiments in that partial configuration information is added to the symptom together with information about the correctness/incorrectness of the detected results.

Figure 25:
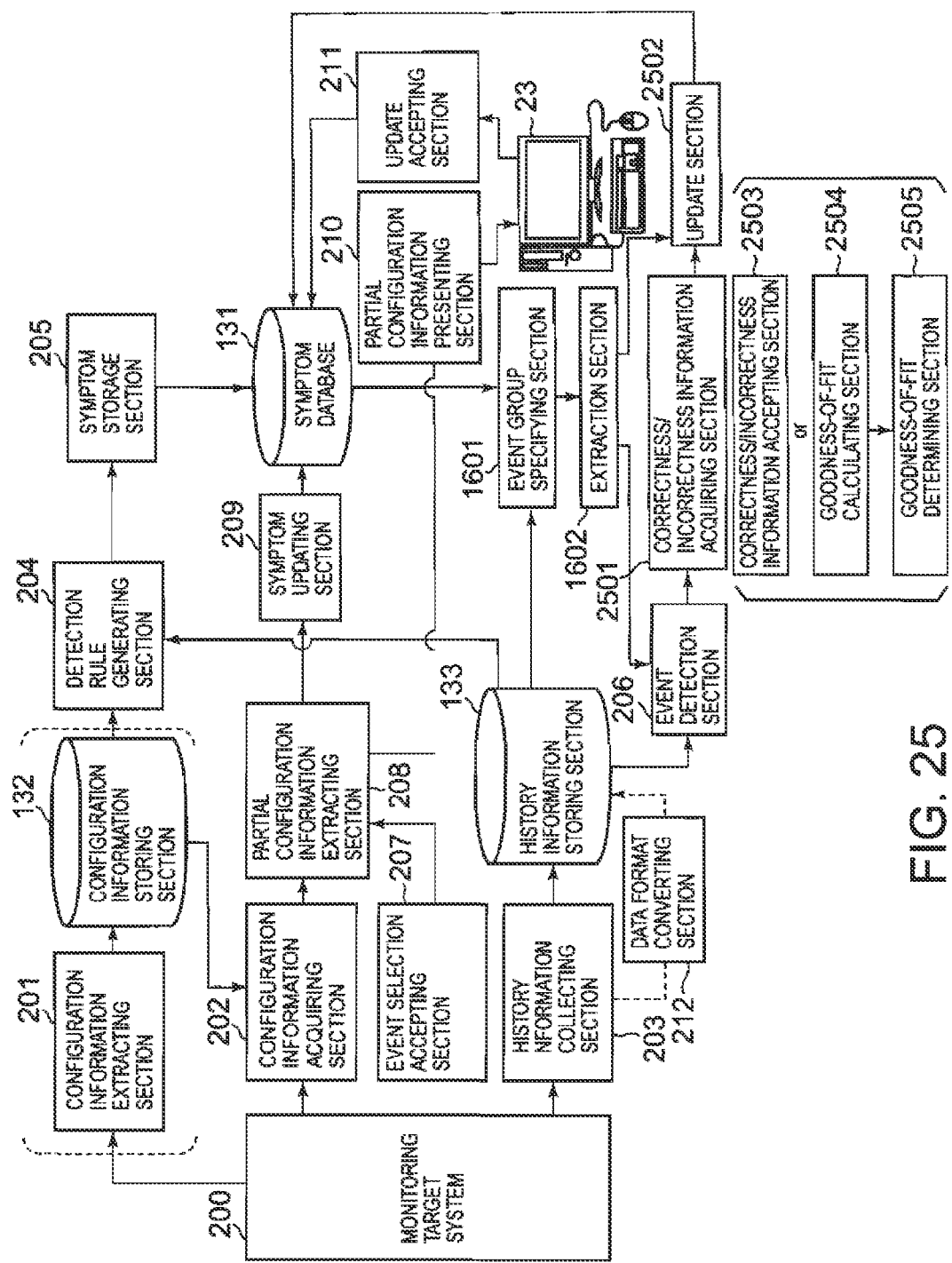
FIG. 25 is a functional block diagram of a failure event detecting apparatus according to an illustrative embodiment.

FIG. 25 is a functional block diagram of a failure event detecting apparatus 1 according to an illustrative embodiment. The configuration information extracting section 201 extracts system configuration information including related information among components included in the monitoring target system 200, and stores it in the configuration information storing section 132. The system configuration information including the related information among components includes, for example, information on the relation of connections among components in communication, link related information related to an operating/non-operating relationship, etc. Note that the configuration information extracting section 201 is not a structural element indispensable to the illustrative embodiments, and the system configuration information may be generated beforehand in the configuration information storing section 132, or may not be incorporated in the failure event detecting apparatus 1. In other words, the configuration information extracting section 201 and the configuration information storing section 132 are not structural elements indispensable to the failure event detecting apparatus 1 according to the depicted embodiment.

The configuration information acquiring section 202 acquires the system configuration information stored in the configuration information storing section 132. The system configuration information is stored in the configuration information storing section 132 in association with each monitoring target system 200, and the configuration information acquiring section 202 acquires corresponding system configuration information according to the monitoring target system 200.

The history information collecting section 203 monitors the monitoring target system 200 at all times, collects history information including log information output from each component included in the monitoring target system 200 and/or failure information such as event information output upon occurrence of a failure, and stores the history information in the history information storing section 133. The log information is not limited to system logs output at all times, and it may include message information output by interrupt processing or the like at the time of failure occurrence.

Note that the pieces of history information collected by the history information collecting section 203 are often different in data format so that they may not be able to be used as they are as basic information for identifying events as candidates for an event that has caused a failure. Therefore, it is desirable to include the data format converting section 212 in order to convert the pieces of history information into a standard unified data format and store them in the history information storing section 133.

The detection rule generating section 204 generates a detection rule for detecting an event included in a component and related to the failure that has occurred. The symptom storage section 205 stores a symptom with certain additional information added to the generated detection rule. As the additional information, information related to recommended actions and the like at the time of failure detection, message information including various comments, etc. are added.

The event selection accepting section 207 accepts selection of the event, included in the component related to the failure that has occurred, as selection from the event list or the like, for example. The partial configuration information extracting section 208 extracts, from the system configuration information acquired by the configuration information acquiring section 202, partial configuration information as the system configuration information related to the component that sent out the event the selection of which has been accepted by the event selection accepting section 207. The partial configuration information to be extracted includes related information including dependencies between the component which, among the components constructing the system, sent out the event the selection of which has been accepted as a failure causing event, and other components. For example, related information between an application server and a database, both being components, link information, etc. are included.

The structure of the symptom including the partial configuration information in the failure event detecting apparatus 1 according to this embodiment is the same as the structure shown in FIG. 3(*b*) according to embodiments described above. In other words, information related to a dependency between application server A and database B, both being components, is added to a conventional symptom, so that the dependency between components can be considered as the symptom for detecting a failure causing event, thereby making it possible to more improve detection accuracy of the failure causing event.

The symptom updating section 209 adds the partial configuration information extracted by the partial configuration information extracting section 208 to a corresponding symptom, and stores it. In other words, the partial configuration information becomes additional information. The partial configuration information presenting section 210 presents, to the display device 23, the partial configuration information extracted by the partial configuration information extracting section 208. The update accepting section 211 accepts an update of the presented partial configuration information. This allows the user to change the presented partial configuration information to a desired structure in order to generate suitable partial configuration information without fail.

Since the screen 80 presented on the display device 23 by means of the partial configuration information presenting section 210 is the same as that in Embodiment 2, the detailed description thereof will be omitted.

In the depicted embodiment, it is assumed that symptoms to which partial configuration information is added as mentioned above, and symptoms to which partial configuration information is not added like in the conventional are mixed and stored in the symptom database 131. Therefore, it is, of cause, understood that if a symptom to which partial configuration information is added is applied, the structure of the symptom similar to that of the previously described embodiments as mentioned above is employed to get an equivalent effect.

Thus, this embodiment is configured such that, like the previously described embodiment, the event group specifying section 1601 specifies an event group that fits each of the stored symptoms based on the pieces of history information collected by the history information collecting section 203 and the symptoms stored in the symptom database 131, and the extraction section 1602 extracts partial configuration information including related information between each of the components, which sent out each of the event groups specified by the event group specifying section 1601, and other components.

The event detection section 206 applies the partial configuration information extracted by the extraction section 1602 and the symptom that is the basis for specifying each of the event groups to detect an event that has caused a failure. A correctness/incorrectness information acquiring section 2501 acquires correctness/incorrectness information as to whether the result of detection by the event detection section 206 is correct or not, i.e., whether the event that has caused the failure is detected correctly.

An update section 2502 updates the symptom that is basis for specifying the event group in such a manner to add the acquired correctness/incorrectness information and the extracted partial configuration information to the symptom as additional information. This makes it possible to add the partial configuration information together with the correctness/incorrectness information to any symptom having no partial configuration information.

The correctness/incorrectness information acquiring section 2501 may be a correctness/incorrectness information accepting section 2503 for accepting input of a correctness/incorrectness determination result from the user. In this case, the result of determination as to whether a failure causing event displayed on the screen is correct or not is accepted by clicking a mouse or the like, for example, on a "acknowledge" button or a "correct" button.

Alternatively, like in the previously described embodiment, the goodness of fit may be calculated to make a correctness/incorrectness determination according to whether the goodness-of-fit value is larger than a predetermined value or not. In this case, a goodness-of-fit calculating section 2504 calculates the goodness of fit of the partial configuration information extracted by the extraction section 1602 to the partial configuration information included in the symptom stored in the symptom database 131 and used by the event group specifying section 1601 to specify the event group. If a symptom having a high goodness of fit has been detected, it can be determined that the possibility of a false positive in failure determination is low. Further, the failure determination can be made with a certain degree of accuracy without being dependent on the level of skill needed for the user to apply a symptom. In other words, the event detection section 206 applies a symptom having a high goodness of fit to detect the event that has caused the failure, so that the possibility of a false positive can be reduced, thereby making it possible to improve the detection accuracy of the failure causing event.

A goodness-of-fit determining section 2505 determines whether the calculated goodness-of-fit value is larger than the predetermined value. The update section 2502 updates the symptom database 131 in such a manner to add, to the symptom, correctly detected configuration information to which information indicating that the partial configuration information extracted by the extraction section 1602 has been correctly detected is added if it is determined that the calculated goodness-of-fit value is larger than the predetermined value, or incorrectly detected configuration information to which information indicating that the partial configuration information extracted by the extraction section 1602 has been incorrectly detected is added. This makes it possible to give priority to applying a symptom having the partial configuration information to which information indicating that it has been correctly detected is added, and hence to detect the failure causing event more accurately.

Figure 26:
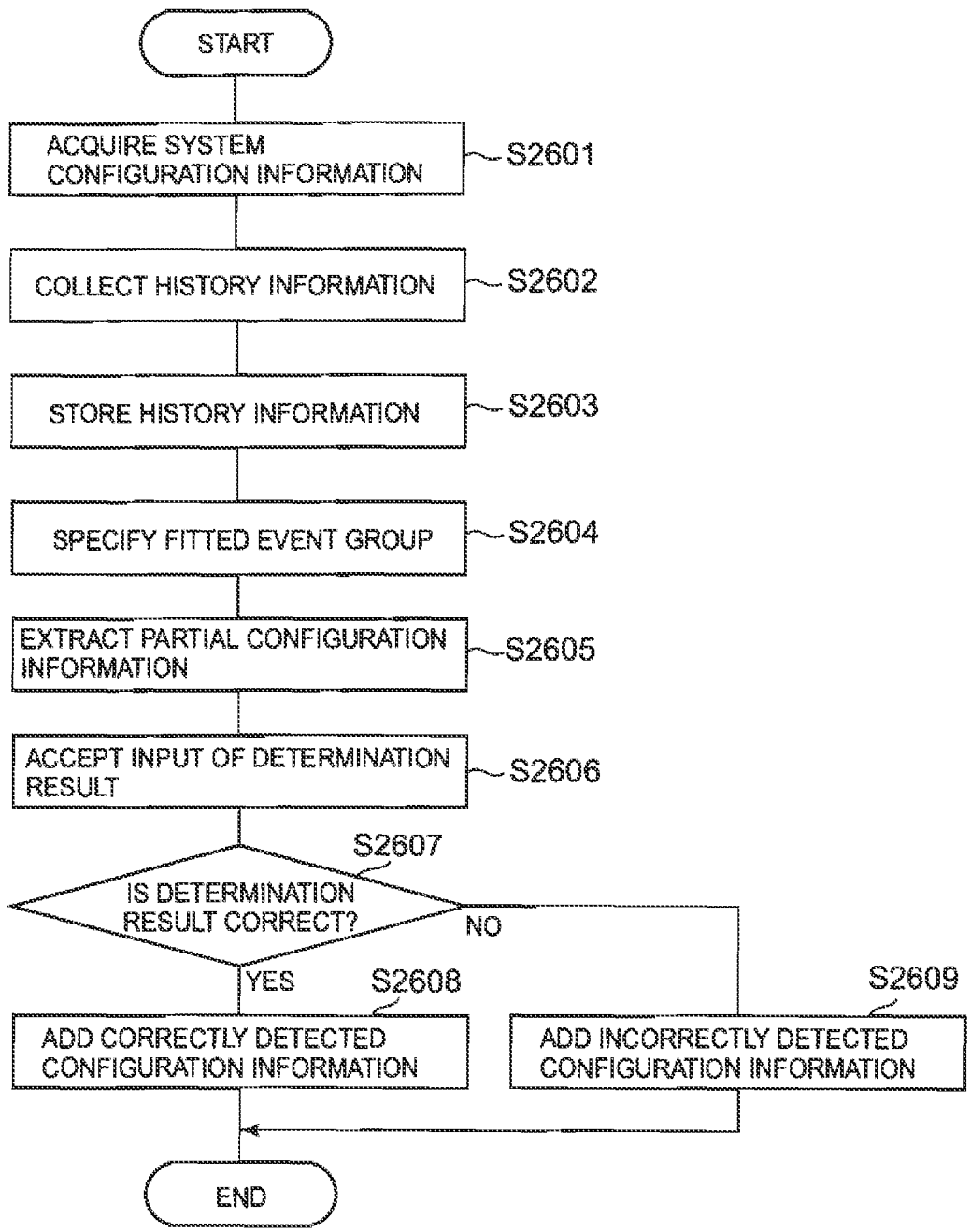
FIG. 26 is a flowchart showing a procedure of failure detection processing performed by the CPU of the failure event detecting apparatus according to an illustrative embodiment.

FIG. 26 is a flowchart showing a procedure of failure detection processing performed by the CPU 11 of the failure event detecting apparatus 1 according to an illustrative embodiment. The CPU 11 of the failure event detecting apparatus 1 acquires system configuration information including related information among components included in the monitoring target system 200 (step S2601). Of course, the system configuration information may be acquired beforehand and prestored in the configuration information storing section 132.

The CPU 11 collects pieces of history information including log information of the monitoring target system 200 and/or failure information output from each component upon occurrence of a failure (step S2602), and stores them in the history information storing section 133 (step S2603). Then, based on the collected pieces of history information and the symptoms stored in the symptom database 131, the CPU 11 specifies an event group that fits each of the stored symptoms (step S2604).

The CPU 11 extracts partial configuration information including related information between each of components, which sent out each of the specified event groups, and other components (step S2605), and receives input of a result of determination as to whether a symptom that fits a failure that has occurred in the monitoring target system has been detected correctly (step S2606). Then, the CPU 11 determines whether the received determination result indicates that the symptom has been detected correctly (step S2607).

If determining that the received determination result indicates that the symptom has been detected correctly (YES in step S2607), the CPU 11 updates the symptom database 131 in such a manner to add, to the applied symptom, the correctly detected configuration information made up by adding, to the partial configuration information, information indicating that the symptom has been detected correctly (step S2608). On the other hand, if determining that the received determination result indicates that the symptom has not been detected correctly (NO in step S2607), the CPU 11 updates the symptom database 131 in such a manner to add, to the applied symptom, the incorrectly detected configuration information made up by adding, to the partial configuration information, information indicating that the symptom has been detected incorrectly (step S2609). This makes it possible to generate a symptom, to which partial configuration information is added, together with information indicating whether the detection result has been detected correctly or not.

Thus, even in the case of the symptom to which no partial configuration information is added upon symptom generation, if the correctly detected configuration information is newly added, it is assured that the failure causing event can be detected correctly by applying the symptom. On the other hand, if the incorrectly detected configuration information is newly added, the possibility of applying the symptom can be reduced to increase the possibility of correctly detecting the failure causing event.

Further, like in an alternative embodiment described previously, the acquired system configuration information may be compared with the correctly detected configuration information or the incorrectly detected configuration information added to the symptom to calculate the degree of coincidence therebetween in order to prioritize the symptoms to be applied. In this case, like in an alternative embodiment described previously, the degree-of-coincidence calculating section 701, and the symptom extracting section 702 are so provided that the CPU 11 compares the system configuration information acquired by the configuration information acquiring section 202 with the correctly detected configuration information or the incorrectly detected configuration information added to the symptom and stored by means of the update section 2502 to calculate the degree of coincidence therebetween for each piece of correctly detected configuration information or incorrectly detected configuration information.

In the case of the correctly detected configuration information, a symptom the calculated degree of coincidence of which is high is given high priority and applied, so that the detection accuracy of the event that has caused the failure can be improved. In the case of the incorrectly detected configuration information, a symptom the calculated degree of coincidence of which is high is given low priority, so that the detection accuracy of the event that has caused the failure can be improved. Further, even in the case of a symptom to which the incorrectly detected configuration information is added and the calculated degree of coincidence of which is high, the symptom may be applied to make use of the detection result as a detection result for a false positive.

Further, when the incorrectly detected configuration information is added to a symptom, the goodness of fit of the detection result may be calculated in the same manner as in the previously described embodiment to reduce the possibility of application of the symptom. For example, the CPU 11 causes the goodness-of-fit calculating section 2504 to calculate the goodness of fit of the partial configuration information extracted by the extraction section 1602 to the partial configuration information included in the symptom used by the event group specifying section 1601 to specify the event group. Then, if the goodness of fit determining section 2505 determines that the calculated goodness of fit is larger than the predetermined value, it is determined to be the incorrectly detected configuration information. In this case, for example, the evaluation value is subtracted, or processing for lowering the priority is performed, to ensure that symptoms having high goodness-of-fit values are removed from the symptom candidates to be applied to detection of the failure causing event. As a result, the detection accuracy of the failure causing event can be improved.

Figure 27:
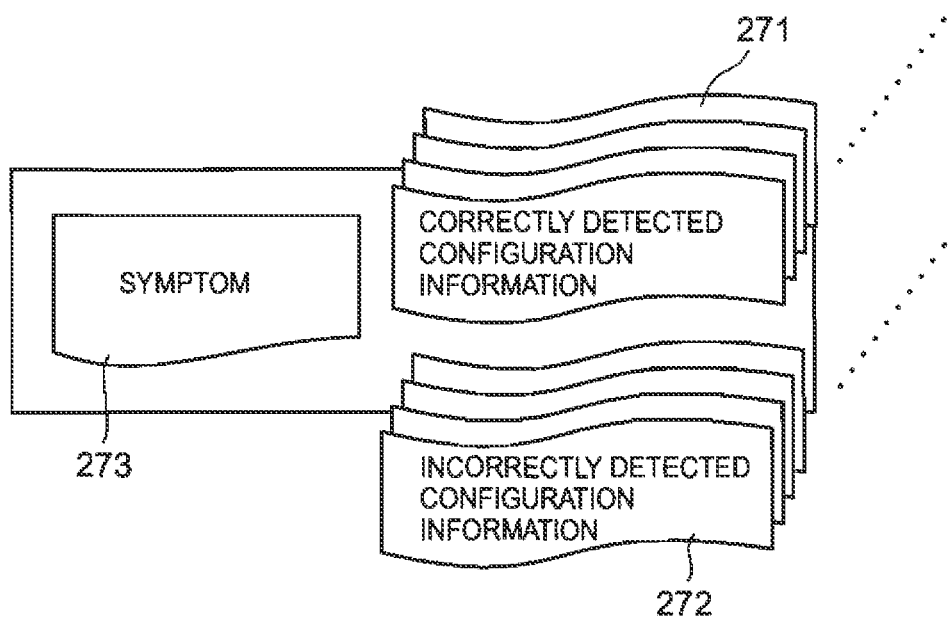
FIG. 27 is an illustration of the data structure of a symptom database to which correctly detected configuration information and incorrectly detected configuration information are added in accordance with an example embodiment.

Plural pieces of correctly detected configuration information and incorrectly detected configuration information may be added to one symptom. FIG. 27 is an illustration of the data structure of the symptom database 131 to which the correctly detected configuration information and the incorrectly detected configuration information are added in accordance with an example embodiment. As shown in FIG. 27, plural pieces of correctly detected configuration information 271 and plural pieces of incorrectly detected configuration information 272 are added in association with one symptom 273, respectively.

For example, a counting section (not shown) is so provided that when plural pieces of correctly detected configuration information 271, 271, . . . are associated with one symptom, the number of times to be added is counted for each piece to preferentially apply partial configuration information that is added more times. This makes it possible to preferentially apply partial configuration information determined to have been detected corrected and added more times, and hence to improve the detection accuracy of the event that has caused the failure.

On the other hand, when plural pieces of incorrectly detected configuration information 272, 272, . . . are associated with one symptom, another counting section (not shown) for counting the number of times each piece of incorrectly detected configuration information is added to the symptom is provided to perform, for example, processing for lowering the application priority of partial configuration information added more times. This makes it possible to reduce the possibility of applying partial configuration information determined to be a false positive and added more times, and hence to improve the detection accuracy of the event that has caused the failure.

Thus, according to the depicted example, even if a symptom does not hold partial configuration information, partial configuration information can be added to the symptom according to the detection result of the failure causing event. This makes it possible to easily determine, from the added partial configuration information, which symptom should be preferentially used, and hence to improve the detection accuracy of the failure causing event. Further, partial configuration information acquired when a wrong failure causing event has been detected may be so stored that the goodness of fit to the partial configuration information used upon occurrence of a false positive can be presented, thereby making it possible to prioritize the order of application of symptoms based on the goodness of fit with a higher degree of accuracy.

The present invention is not limited to the aforementioned embodiments, and various changes and modifications are possible within the scope of the present invention. For example, the symptom database, the configuration information storing section, and the history information storing section may be provided in a storage device of an external computer connected through a network to the failure event detecting apparatus according to any one of the embodiments to read or write various pieces of information as necessary.

The invention claimed is:

1. A method comprising:
    collecting history information of a system including plural components, the history information including log information of the system and failure information output from at least one component upon occurrence of a failure in the system;
    generating a detection rule for detecting an event included in at least one component related to the failure that has occurred;
    storing a symptom with additional information added to the generated detection rule;
    acquiring system configuration information as configuration information of the system;
    accepting selection of an event;
    extracting, from the acquired system configuration information, partial configuration information as system configuration information related to a component that sent out the event the selection of which has been accepted; and
    adding the extracted partial configuration information to the symptom to update the symptom.

2. The method of claim 1, wherein the instructions further cause the processor to:
    calculate a degree-of-confidence value associated with the partial configuration information;
    sort symptoms in ascending order of degree-of-confidence value; and
    extract symptoms in order of degree-of-confidence.

3. The method of claim 2, wherein calculating the degree-of-confidence value comprises:
    for each matching component, calculating a first degree-of-confidence value based on a first coefficient and an assigned value of the component;
    for each link, calculating a second degree-of-confidence value based on a second coefficient and an assigned value of the link; and
    adding the first degree-of-confidence value and the second degree-of-confidence value to form the degree-of-confidence value.

4. The method of claim 3, wherein calculating the degree-of-confidence value further comprises:
    responsive to there being consecutive links, adding a third degree-of-confidence value to the degree-of-confidence value.

5. The method of claim 1, wherein the instructions further cause the processor to:
    calculate a goodness of fit value associated with the partial configuration information; and
    present symptom, partial configuration information, and goodness of fit value to the user.

6. The method of claim 5, wherein calculating the goodness of fit value comprises:
    for each matching component, calculating a first goodness of fit value based on a first coefficient and an assigned value of the component;
    for each link, calculating a second goodness of fit value based on a second coefficient and an assigned value of the link; and
    adding the first goodness of fit value and the second goodness of fit value to form the goodness of fit value.

7. The method of claim 6, wherein calculating the goodness of fit value further comprises:
    responsive to there being consecutive links, adding a third goodness of fit value to the goodness of fit value.

8. The method of claim 1, wherein the instructions further cause the processor to:
    receive an input of a result of determination as to whether a symptom that fits the failure that has occurred has been detected correctly;
    responsive to a determination that the symptom fits correctly, add to the partial configuration information an indication that the symptom was detected correctly; and
    responsive to a determination that the symptom does not fit correctly, add to the partial configuration information an indication that the symptom was detected incorrectly.

9. The method of claim 1, extracting partial configuration information comprises extracting the partial configuration information to include related information among the components.

10. The method of claim 1, further comprising:
    presenting the partial configuration information to a user; and
    accepting an update of the presented partial configuration information from the user.

11. The method of claim 1, further comprising:
    converting the log information and failure information into a unified data format.

* * * * *